US007463342B2

(12) United States Patent  (10) Patent No.: US 7,463,342 B2
Kim et al.  (45) Date of Patent: Dec. 9, 2008

(54) OPTICAL TRACKING DEVICE USING MICROMIRROR ARRAY LENSES

(75) Inventors: Hye Young Kim, Jeonbuk (KR); Jin Young Sohn, Fullerton, CA (US); Gyoung Il Cho, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 0 days.

(21) Appl. No.: 11/743,656

(22) Filed: May 2, 2007

(65) Prior Publication Data

US 2008/0273191 A1  Nov. 6, 2008

(51) Int. Cl.
G01P 3/36 (2006.01)
(52) U.S. Cl. ............................ 356/29; 356/28.5; 356/28
(58) Field of Classification Search ....... 356/3.01–3.15, 356/4.01–4.1, 5.01–5.15, 6–22, 28, 28.5, 356/29
See application file for complete search history.

(56) References Cited

U.S. PATENT DOCUMENTS 7,209,286 B2* 4/2007 Mann et al. ................. 359/366
2005/0206773 A1* 9/2005 Kim et al. ................... 348/340
2006/0171263 A1* 8/2006 Cho et al. ................. 369/44.23
2006/0209423 A1* 9/2006 Kim et al. ................... 359/676
2007/0263113 A1* 11/2007 Baek et al. .................. 348/340

* cited by examiner

Primary Examiner—Thomas H Tarcza
Assistant Examiner—Luke D Ratcliffe

(57) ABSTRACT

The optical tracking device of this invention comprises a lens unit, a control circuitry communicatively coupled to the lens unit, and an imaging unit optically coupled to the lens unit. The lens unit comprises at least one Micromirror Array Lens, wherein the Micromirror Array Lens comprises a plurality of micromirrors and is configured to have a plurality of optical surface profiles by controlling rotations or translations of the micromirrors. The optical tracking device of the invention further comprises an image processing unit, communicatively coupled to the imaging unit, configured to process the image information from the imaging unit and generates a control signal for the control circuit to control the lens unit. The optical tracking device of the present invention provides capability of tracking a target moving in a high speed, providing three-dimensional image information of the object, and compensating the aberration of the optical tracking device.

48 Claims, 14 Drawing Sheets

OPTICAL TRACKING DEVICE USING MICROMIRROR ARRAY LENSES

FIELD OF THE INVENTION

The present invention relates to optical devices in general, and more specifically to an optical tracking device.

BACKGROUND OF THE INVENTION

Tracking systems have numerous applications, including those detailed in the following patents; autonomous vehicles (U.S. Pat. No. 6,535,114), monitoring systems (U.S. Pat. No. 6,690,374), sports cameras (U.S. Pat. No. 6,567,038), conference video systems (U.S. Pat. No. 6,507,366), surgery (U.S. Pat. Nos. 6,725,079 and 6,662,036), positioning (U.S. Pat. No. 6,490,473), inspection (U.S. Pat. No. 6,259,960), spotlighting (U.S. Pat. No. 6,079,862), and machining (U.S. Pat. No. 6,429,404). Tracking systems use certain distinguishing features of a target being tracked as sources for detecting, tracking, or engaging the target. These features can be any form of energy emitted or reflected from the target including radio, millimeter-wave, infrared, visible light, laser, ultraviolet, and sound. Each energy source has different characteristics in terms of accuracy, response speed, maximum operation range, and operation environment such as weather and day/night. Since each electro-magnetic or mechanical wave has different characteristics, disadvantages of one wave can be compensated by advantages of others when some of them are employed together. For example, a tracking system can use both infrared and millimeter wave for providing all weather operation capability. Also, a tracking system can use both infrared and visual light for providing a day/night operation capability.

Many applications using tracking systems require high positioning accuracy and fast tracking ability with a reliable structural stability; e.g. star trackers, optical seekers, and robot vision. Optical tracking devices are well suited for these purposes. The optical tracking device typically requires an imaging system comprising a lens unit, an imaging unit having image sensors, and an image processing unit. For the image sensors, various solid-state focal plane arrays for different energy sources can be used such as CCD (charge-coupled device) or CMOS APS (complementary metal-oxide-semiconductor Active Pixel Sensor) for visible light and QWIP (Quantum Well Infrared Photodetector) for infrared. The CCD image sensor used to be a choice for many optical tracking devices for a long time because of its high sensitivity and high signal to noise ratio. However, it comes with high cost and slow response due to pixel to pixel charge transfer and tends to result in a large package because the control circuitry cannot be integrated into an image sensor. Currently, the CMOS APS has shown nearly equivalent to or better performance than the CCD image sensor. In addition, it provides many advantages including on-chip circuit integration, random pixel access, and low power consumption.

The imaging systems for the conventional optical tracking devices can be divided into two groups. One group uses a single camera while the other group uses a plurality of cameras. The imaging system with a single camera generally has a simpler configuration and image processing scheme than its counterpart. However, the optical tracking device with the single camera cannot produce three-dimensional image information. Furthermore, it is difficult to extract distance information from the single camera unless it is used in combination with a device such as a range finder. Additionally, it is easy to lose track of fast moving targets because a field of view (FOV) of the single camera is limited. Therefore, the imaging system with the single camera typically has a high 'tracking dropout' rate.

The imaging system with the plurality of cameras is capable of generating three-dimensional image information by disposing the lenses of cameras to have different viewing angles in order to use binocular parallax phenomena. Also, it can be configured to reduce the tracking dropout rate by using at least two lenses with different fields of view; for example, one narrow FOV for high resolution image and one wide FOV for low tracking dropout rate. U.S. Pat. No. 6,734,911 to Lyons describes such a system using a dual-angle lens to obtain both wide-angle image and narrow-angle image of a scene. However, the system described in the '911 patent uses a very complex lens configuration and generates large image distortion for wide-angle image. Furthermore, this system requires that the attitude of the imaging camera be adjusted by a servo motor. The imaging system with multiple cameras yields a complicated structure and requires a complicated image processing scheme.

Optical tracking devices usually require a camera attitude control system so that the image of the target can be in the center of the image sensor. Typically, the attitude of the camera is adjusted by using a servo motor or a gimbal system having macroscopic mechanical movements as disclosed in the U.S. Pat. No. 6,507,366 to Lee. These optical tracking devices with macroscopic mechanical movements, however, tend to be bulky and heavy with low imaging speed and high power consumption and involved with complicated alignment and calibration processes.

FIGS. 1 (1a~1b) are block diagrams of conventional optical tracking devices. In FIG. 1a, a conventional optical tracking device 11 includes an imaging system 12 configured to capture images. The imaging system 12 may use either a visual or infrared wavelength. The imaging system using a visual wavelength may acquire a color image, but do not perform well at night or in heavy fog. The imaging system using an infrared wavelength cannot acquire a color image, but may be used at night or in heavy fog. Regardless of whether the imaging camera uses visual or infrared light, the construction of the imaging system may be similar in its components.

The imaging system 12 comprises an image sensor 13, configured to sense an image. The image sensor 13 may sense either a visual or infrared wavelength. The optical tracking device 11 also includes an image processor 14, communicatively coupled to the image sensor 13, configured to process the images sensed by the image sensor 13 and to generate an output signal 15. The image processor 14 may include a target-identifying algorithm.

In FIG. 1b, a conventional optical tracking device 16 includes a tracking controller 17, communicatively coupled to the image processor 14. The image processor 14 is configured to generate image data 18A and position information of a target and the tracking controller 17 is configured to generate a tracking signal 18B. In one embodiment, the tracking controller 17 includes a camera attitude control algorithm and attitude controller. A movement system 19 is mechanically coupled to the imaging system 12 and communicatively coupled to the tracking controller 17, configured to adjust the attitude of the imaging system 12 in response to the tracking signal 18B from the tracking controller 17. In one embodiment, the movement system 19 may include, for example, a servo or gimbal system.

The advanced optical tracking device have to track a fast moving target, provide the three-dimensional image information of the target, and compensate the aberration of the optical tracking device with simplified construction.

SUMMARY OF INVENTION

The present invention addresses the problems of the prior art and provides an optical tracking device using at least one Micromirror Array Lens, which is capable of tracking a fast moving target, providing three-dimensional image information of the target, and compensating the aberration of the optical tracking device with simplified construction. Also, the optical tracking device of the present invention provides a variable effective focal length, variable field of view, variable magnification, and variable optical axis capabilities.

The optical tracking device of this invention comprises a lens unit, a control circuitry communicatively coupled to the lens unit, and an imaging unit optically coupled to the lens unit. The lens unit comprises at least one Micromirror Array Lens, wherein the Micromirror Array Lens comprises a plurality of micromirrors and is configured to have a plurality of optical surface profiles by controlling rotations or translations of the micromirrors.

The general principle and methods for making the Micromirror Array Lens are disclosed in U.S. Pat. No. 6,970,284 issued Nov. 29, 2005 to Kim, U.S. Pat. No. 7,031,046 issued Apr. 18, 2006 to Kim, U.S. Pat. No. 6,934,072 issued Aug. 23, 2005 to Kim, U.S. Pat. No. 6,934,073 issued Aug. 23, 2005 to Kim, U.S. Pat. No. 7,161,729 issued Jan. 9, 2007, U.S. Pat. No. 6,999,226 issued Feb. 14, 2006 to Kim, U.S. Pat. No. 7,095,548 issued Aug. 22, 2006 to Cho, U.S. patent application Ser. No. 10/893,039 filed Jul. 16, 2004, U.S. patent application Ser. No. 10/983,353 filed Nov. 8, 2004, U.S. patent application Ser. No. 11/076,616 filed Mar. 10, 2005, and U.S. patent application Ser. No. 11/426,565 filed Jun. 26, 2006, all of which are incorporated herein by references.

The micromirrors in the Micromirror Array Lens can be individually controlled electrostatically or electromagnetically and have multiple motions by controlling up to three degree of freedom motion including two degrees of freedom rotational motion and one degree of freedom translational motion. Since the micromirrors in the Micromirror Array Lens can have multiple motions, the Micromirror Array Lens can form a plurality of optical surface profiles. The Micromirror Array Lens can change its focal length, field of view, or optical axis by changing its optical surface profile. Therefore, the Micromirror Array Lens is a variable focusing lens having a variable focusing property. Also, the Micromirror Array Lens is an adaptive optical component which compensates the aberration of an optical system. The Micromirror Array Lens comprising micromirrors has a variable focusing property, a very fast response time, a large focal length variation, a high optical focusing efficiency, a simple focusing structure, low power consumption, and a low production cost thanks to a mass production advantage.

The general principle, structure and methods for making the micromirror array devices and Micromirror Array Lens are disclosed in U.S. patent application Ser. No. 10/872,241 filed Jun. 18, 2004, U.S. patent application Ser. No. 11/072,597 filed Mar. 4, 2005, U.S. patent application Ser. No. 11/347,590 filed Feb. 4, 2006, U.S. patent application Ser. No. 11/369,797 filed Mar. 6, 2006, U.S. patent application Ser. No. 11/463,875 filed Aug. 10, 2006, U.S. patent application Ser. No. 11/534,613 filed Sep. 22, 2006, U.S. patent application Ser. No. 11/534,620 filed Sep. 22, 2006, U.S. patent application Ser. No. 11/549,954 filed Oct. 16, 2006, U.S. patent application Ser. No. 11/609,882 filed Dec. 12, 2006, U.S. patent application Ser. No. 11/685,119 filed Mar. 12, 2007, and U.S. patent application Ser. No. 11/693,698 filed Mar. 29, 2007, all of which are incorporated herein by references.

The control circuitry in the optical tracking device is configured to control the motions of micromirrors in the Micromirror Array Lens to form optical surface profiles for changing at least one focusing property of the lens unit. The focusing property of the lens unit is an effective focal length of the lens unit. The focusing property of the lens unit is an optical axis of the lens unit. The focusing property of the lens unit is a magnification of the lens unit. The focusing property of the lens unit is a field of view of the lens unit.

The imaging unit in the optical tracking device comprises at least one image sensor and is configured to receive a scene image formed by the lens unit to generate the image information of the scene image, wherein the scene image can include a target image if the target is within a field of view of the lens unit.

The optical tracking device of the invention further comprises an image processing unit, communicatively coupled to the imaging unit, configured to process the image information from the imaging unit and generates a control signal for the control circuit to control the lens unit. Using the processed image information, the image processing unit determines a next action that has to be performed by the lens unit and generates the control signal for the control circuit, accordingly.

According to the control signal, the control circuit controls the lens unit to change at least one focusing property of the lens unit, wherein the focusing properties of the lens unit include the effective focal length of the lens unit, the optical axis of the lens unit, the magnification of the lens unit, and the field of view of the lens unit. In the present invention, the Micromirror Array Lens plays a major role to change these focusing properties of the lens unit by forming an optical surface profile providing a required focusing property to the lens unit. Also, the focusing property of the lens unit can be controlled by both the Micromirror Array Lens and a conventional variable focus lens or lens group. The conventional variable focus lens or lens group can be a fixed focal length lens or lens group having macroscopic mechanical lens movements or a non-MMAL (Micromirror Array Lens) variable focus lens.

The image processing can start with a target search process from the scene image using a target search algorithm. When the target search process fails, the image processing unit generates a control signal to adjust at least one focusing property of the lens unit including the field of view and optical axis of the lens unit in order to continue the target search process. When the target search process succeeds, the image processing unit extracts target movement information from the scene image and generates a control signal based on the target movement information. The control signal makes the lens unit change at least one focusing property of the lens unit to perform a next action.

By changing at least one focusing property of the lens unit including the effective focal length of the lens unit, the focus status or magnification of the image can be adjusted. For example, the target image in the scene image can be refocused in order to provide a sharper target image. The effective focal length of the lens unit can be adjusted in high speed because the motions of micromirrors in the Micromirror Array Lens can be controlled very fast, which allows that the optical tracking device with the Micromirror Array Lens can maintain focus on a fast moving target. Furthermore, by changing at least one focusing property of the lens unit, the resolution of the image can be adjusted. To obtain high-resolution images, the optical tracking device is configured to have a narrow field of view. However, it is possible to lose the target from the field of view of the lens unit when the movement of the target is fast. In order to reduce the tracking dropout rate, the optical tracking device is configured to have a wide field of view. Using the time-sharing technique, the optical tracking device with the Micromirror Array Lens can provide both a high resolution image with the narrow field of view and a low solution image with the wide field of view within a short time period.

By changing at least one focusing property of the lens unit including the optical axis of the lens unit, the target image can be placed at the desired location of the image sensor such as at the center of the image sensor. Also, the ability to change the optical axis of the Micromirror Array Lens may allow an optical tracking device having a large tracking area without a servo mechanism or a gimbal system for controlling the attitude of the optical tracking system.

The Micromirror Array Lens can form a lens having an optical surface profile simulating an arbitrary curved surface. To be a good lens, the lens must satisfy two conditions. One is the convergence condition that all light rays scattered from one point of an object should converge into one point of an image plane. The other is the phase matching condition that all converging light rays should have the same phase at the image plane. To satisfy the lens conditions, the surface of conventional reflective lens is formed to have all light rays scattered by one point of an object be converged into one point of the image plane and have the optical path length of all converging light rays be the same.

The array of the micromirrors arranged in the substantially flat surface or in the curved surface can satisfy these two conditions. The surface profile of the array of the micromirrors satisfies the convergence condition, wherein arbitrary scattered light rays from one point of the object are converged into one point of the image plane by adjusting the rotational and/or translational motions of each micromirror. Also, the surface profile of the array of the micromirrors satisfies the phase matching condition, wherein the phases of all converging light rays are adjusted to be the same. Even though the optical path lengths of light rays converged by the array of the micromirrors are different from those of an equivalent conventional reflective lens, the same phase condition can be satisfied by adjusting the rotational and/or translational motions of each micromirror because the phase of light is periodic. The required maximum translational displacement is at least half of the wavelength of light. Half wavelength of translational motion is enough to satisfy the same phase condition by use of the periodicity of the light. The array of the micromirrors satisfies both convergence and phase matching conditions. Therefore, the array of the micromirrors can form a Micromirror Array Lens having the surface profile satisfying the convergence and the phase matching conditions and performing the lens properties.

The micromirror Array Lens can simulate various curved surfaces that are used in conventional optical devices. The optical surface profile of the Micromirror Array Lens satisfies a convergence condition and a phase matching condition to simulate a flat mirror. The optical surface profile of the Micromirror Array Lens satisfies a convergence condition and a phase matching condition to simulate a parabolic concave mirror. The optical surface profile of the Micromirror Array Lens satisfies a convergence condition and a phase matching condition to simulate a spherical concave mirror. The optical surface profile of the Micromirror Array Lens satisfies a convergence condition and a phase matching condition to simulate a hyperbolic concave mirror. The optical surface profile of the Micromirror Array Lens satisfies a convergence condition and a phase matching condition to simulate an elliptic concave mirror. The optical surface profile of the Micromirror Array Lens satisfies a convergence condition and a phase matching condition to simulate a parabolic convex mirror. The optical surface profile of the Micromirror Array Lens satisfies a convergence condition and a phase matching condition to simulate a spherical convex mirror. The optical surface profile of the Micromirror Array Lens satisfies a convergence condition and a phase matching condition to simulate a hyperbolic convex mirror. The optical surface profile of the Micromirror Array Lens satisfies a convergence condition and a phase matching condition to simulate an elliptic convex mirror.

The general properties of the Micromirror Array Lens are disclosed in U.S. Pat. No. 7,057,826 issued Jun. 6, 2006 to Cho, U.S. Pat. No. 7,173,400, issued Feb. 6, 2007, U.S. patent application Ser. No. 10/896,146 filed Jul. 21, 2004, U.S. patent application Ser. No. 10/979,568 filed Nov. 2, 2004, U.S. patent application Ser. No. 11/218,814 filed Sep. 2, 2005, U.S. patent application Ser. No. 11/359,121 filed Feb. 21, 2006, U.S. patent application Ser. No. 11/382,273 filed May 9, 2006, and U.S. patent application Ser. No. 11/429,034 filed May 5, 2006, all of which are incorporated herein by references.

The lens unit of the present invention can use various configurations including zoom type or telescope type configurations. The conventional zoom type imaging systems use a conventional lens or lens group having macroscopic mechanical lens movements or a non-MMAL variable focus lens such as a liquid crystal lens. The fixed focal length lens or lens group having macroscopic mechanical lens movements has a slow response time and requires a complicated driving mechanism. Also, the fixed focal length lens or lens group having macroscopic mechanical lens movement has a limited variable focusing property because it cannot change its optical axis. On the other hand, the focal length of the non-MMAL variable focus lens can be changed without macroscopic mechanical lens movements. However, the non-MMAL variable focus lens has a limited variable focusing property because it has a slow response time and cannot change its optical axis. They basically comprise a variator for changing the magnification of the lens unit and a compensator for maintaining focus.

However, the zoom type lens unit having a Micromirror Array Lens in the present invention can provide required focusing properties without or with minimal macroscopic mechanical lens movements. The Micromirror Array Lens can be used as a variator. When the Micromirror Array Lens is used as the variator, the functions of the variator is not limited to change only the magnification of the lens unit but extended to change any at least one of the focusing properties of the lens unit described above. Also, the Micromirror Array Lens can be used as a compensator, wherein the compensator is configured to maintain focus of the lens unit.

The lens unit can further comprise a fixed focal length lens or lens group having macroscopic mechanical lens movements, optically coupled to the Micromirror Array Lens. The Micromirror Array Lens is a variator and the fixed focal length lens or lens group having macroscopic mechanical lens movements is a compensator. Alternatively, the fixed focal length lens or lens group having macroscopic mechanical lens movements is a variator and the Micromirror Array Lens is a compensator. Also, both the Micromirror Array Lens and the fixed focal length lens or lens group having macroscopic mechanical lens movements can be configured to change at least one focusing property of the lens unit and maintain focus of the lens unit, together.

The lens unit can further comprise a non-MMAL variable focus lens such as a liquid crystal lens, optically coupled to the Micromirror Array Lens, wherein the focal length of the non-MMAL variable focus lens is changed without macroscopic mechanical lens movements. However, the non-MMAL variable focus lens has a limited variable focusing property because the non-MMAL variable focus lens is slow and can not change its optical axis. The Micromirror Array Lens is a variator and the non-MMAL variable focus lens is a compensator. Alternatively, the non-MMAL variable focus lens is a variator and the Micromirror Array Lens is a compensator. Also, both the Micromirror Array Lens and the non-MMAL variable focus lens can be configured to change at least one focusing property of the lens unit and maintain focus of the lens unit, together.

The lens unit with pan focus can have one Micromirror Array Lens to change at least one focusing property of the lens unit, wherein a compensator maintaining focus of the lens unit is not necessary.

Similar to the zoom type imaging system, the conventional telescope type imaging systems basically comprise a primary mirror and a secondary mirror. In the conventional telescope type imaging systems, the magnification of a lens unit is changed through additional eyepieces at a cost of resolution while other focusing properties cannot be changed. The telescope type lens unit having the Micromirror Array Lens can provide required focusing properties without or with minimal macroscopic mechanical mirror movements and without changing eyepieces. The Micromirror Array Lens can be a primary mirror in the telescope type configuration. The Micromirror Array Lens can be a secondary mirror in the telescope type configuration. The Micromirror Array Lens used as the primary lens may have an opening so that light can pass through the Micromirror Array Lens. The lens unit may further comprise a flat mirror to complete the telescope type configuration.

The lens unit can advantageously use at least two Micromirror Array lenses, wherein the focusing property of the lens unit can be effectively controlled without macroscopic mechanical lens movements. The zoom type lens unit comprises a first Micromirror Array Lens and a second Micromirror Array Lens. The first Micromirror Array Lens is arranged to reflect light from the scene to the second Micromirror Array Lens and the second Micromirror Array Lens is arranged to reflect the light from the first Micromirror Array Lens to the imaging unit. The first Micromirror Array Lens and the second Micromirror Array Lens are positioned so that the path of the light reflected by the first Micromirror Array Lens and the second Micromirror Array Lens is not blocked. Alternatively, the first Micromirror Array Lens and the Second Micromirror Array lens can be disposed to be parallel to each other. In this case, the optical tracking device further comprises a beam splitter positioned between the first Micromirror Array Lens and the second Micromirror Array Lens. The first Micromirror Array Lens and the second Micromirror Array Lens can be used as a variator and a compensator, respectively. Alternatively, the first Micromirror Array Lens and the second Micromirror Array Lens can be used as a compensator and a variator, respectively. It is also possible that the first Micromirror Array Lens and the second Micromirror Array Lens is configured to change at least one focusing property of the lens unit and maintain focus of the lens unit, together.

The Micromirror Array Lens can be the primary mirror having a variable focusing property in the telescope type configuration. The Micromirror Array Lens can be the secondary mirror having a variable focusing property in the telescope type configuration. In the conventional reflective lens, the cost to produce mirrors having some curved surfaces is more expensive than that of others. For example, the spherical mirror can be produced with much less cost than the parabolic mirror. However, the Micromirror Array Lens can produce arbitrary optical surface profiles with the same low cost. Therefore, the optical tracking device using Micromirror Array Lenses does not have to sacrifice the image quality to reduce the cost.

The telescope type lens unit can also advantageously use at least two Micromirror Array lenses. The telescope type lens unit comprises a first Micromirror Array Lens and a second Micromirror Array Lens, wherein the first Micromirror Array Lens is a primary mirror and the second Micromirror Array Lens is a secondary mirror. The first Micromirror Array Lens and the second Micromirror Array can form various telescope type configurations. The first Micromirror Array Lens and the second Micromirror Array form a Newtonian type telescope configuration. The first Micromirror Array Lens and the second Micromirror Array form a Cassegrain type telescope configuration. The first Micromirror Array Lens and the second Micromirror Array form a Gregorian type telescope configuration. Also, the first Micromirror Array Lens and the second Micromirror Array can form various variations of the telescope type configurations described above.

The Lens unit may further include at least one auxiliary lens or lens group depending on the applications of the optical tracking device. The lens unit further comprises a focus lens or lens group to focus an image. The lens unit further comprises an erector lens or lens group to produce an inverted image. The lens unit further comprises a relay lens or lens group to focus the image onto the image sensor. These auxiliary lenses or lens groups can be advantageously used in the zoom type lens unit having a variator and a compensator.

The optical tracking device may further comprise a mechanical movement unit, communicatively coupled to the image processing unit, configured to mechanically adjust attitude of the optical tracking device in response to the control signal in order to adjust the optical axis of the lens unit. Although the optical tracking device comprising the Micromirror Array Lens can change the optical axis of the lens unit, the mechanical movement unit can be combined for a larger tracking area.

Since the Micromirror Array Lens is an adaptive optical component, the lens unit can compensate for the aberration of the optical tracking device by controlling each micromirror of the Micromirror Array Lens. The aberration of the optical tracking device include, but not limited to, phase errors of light introduced by the medium between an object and its image and the defects of the optical tracking device that may cause the image to deviate from the rules of paraxial imagery. The Micromirror Array Lens is further controlled to compensate for chromatic aberration by satisfying the same phase condition for each wavelength of Red, Green, and Blue (RGB), respectively, to get a color image. Further, an object which does not lie on the optical axis can be imaged by the Micromirror Array Lens without macroscopic mechanical movements of the optical tracking device.

The general principle, methods for making the micromirror array devices and Micromirror Array Lens, and their applications are disclosed in U.S. Pat. No. 7,077,523 issued Jul. 18, 2006 to Seo, U.S. Pat. No. 7,068,416 issued Jun. 27, 2006 to Gim, U.S. patent application Ser. No. 10/914,474 filed Aug. 9, 2004, U.S. patent application Ser. No. 10/934, 133 filed Sep. 3, 2004, U.S. patent application Ser. No.

10/979,619 filed Nov. 2, 2004, U.S. patent application Ser. No. 10/979,624 filed Nov. 2, 2004, U.S. patent application Ser. No. 11/076,688 filed Mar. 10, 2005, U.S. patent application Ser. No. 11/208,114 filed Aug. 19, 2005, U.S. patent application Ser. No. 11/208,115 filed Aug. 19, 2005, U.S. patent application Ser. No. 11/382,707 filed May 11, 2006, U.S. patent application Ser. No. 11/419,480 filed May 19, 2006, U.S. patent application Ser. No. 11/423,333 filed Jun. 9, 2006, all of which are incorporated herein by references.

A method for tracking a target using an optical tracking device comprises steps of capturing an scene image using a lens unit having at least one Micromirror Array Lens comprising a plurality of micromirrors and an imaging unit, processing the scene image using an image processing unit and extracting target movement information, generating a control signal, and changing a focusing property of the Micromirror Array Lens by forming an optical surface profile of the Micromirror Mirror Array Lens by controlling motions of the micromirrors in the Micromirror Array Lens according to the control signal. The step of changing the focusing property of the Micromirror Array lens is for changing a focusing status of the scene or target image. The step of changing the focusing property of the Micromirror Array lens is for adjusting an effective focal length of the lens unit. The step of changing the focusing property of the Micromirror Array lens is for adjusting a field of view of the lens unit. The step of changing the focusing property of the Micromirror Array lens is for adjusting an optical axis of the lens unit. The step of changing the focusing property of the Micromirror Array lens is for adjusting a magnification of the lens unit.

The method for tracking the target using an optical tracking device further comprises measuring the distance between the lens unit and the target by extracting an in-focus target image from the scene image using the image processing unit. The method for tracking the target using an optical device further comprises measuring three-dimensional image information of the target by changing a focal plane of the lens unit by adjusting the effect focal length of the lens unit. The method for tracking a target using an optical tracking device further comprises using a time-sharing technique to obtain a wide field of view image and a narrow field of view image within a short time period.

The optical tracking device of the present invention has many advantages. The optical tracking device with the Micromirror Array Lens can maintain focus on a fast moving target because the effective focal length of a lens unit can be quickly changed. Also, a narrow field of view for high resolution image and a wide field of view for a low tracking dropout can be provided using a time-sharing technique. Furthermore, the optical axis of the lens unit can be adjusted to locate the target image at the center of the image sensor. Also, the ability to change the optical axis of the Micromirror Array Lens may allow an optical tracking device having a large tracking area without a servo mechanism or a gimbal system for controlling the attitude of the optical tracking device. The optical tracking device using the Micromirror Array Lens can be simpler and weigh less than conventional tracking systems.

DETAILED DESCRIPTION OF EMBODIMENTS

The present invention will now be described in detail with reference to embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1A:
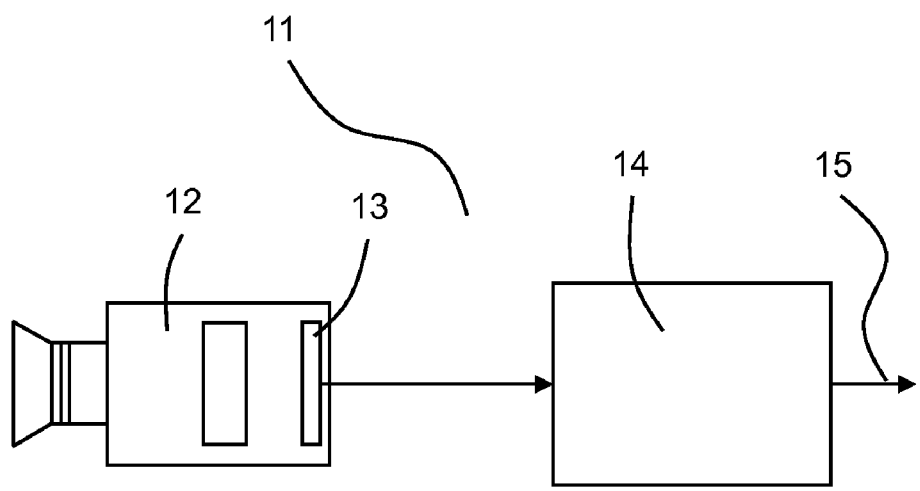
FIG. 1 is block diagrams of conventional optical tracking devices.
Figure 1B:
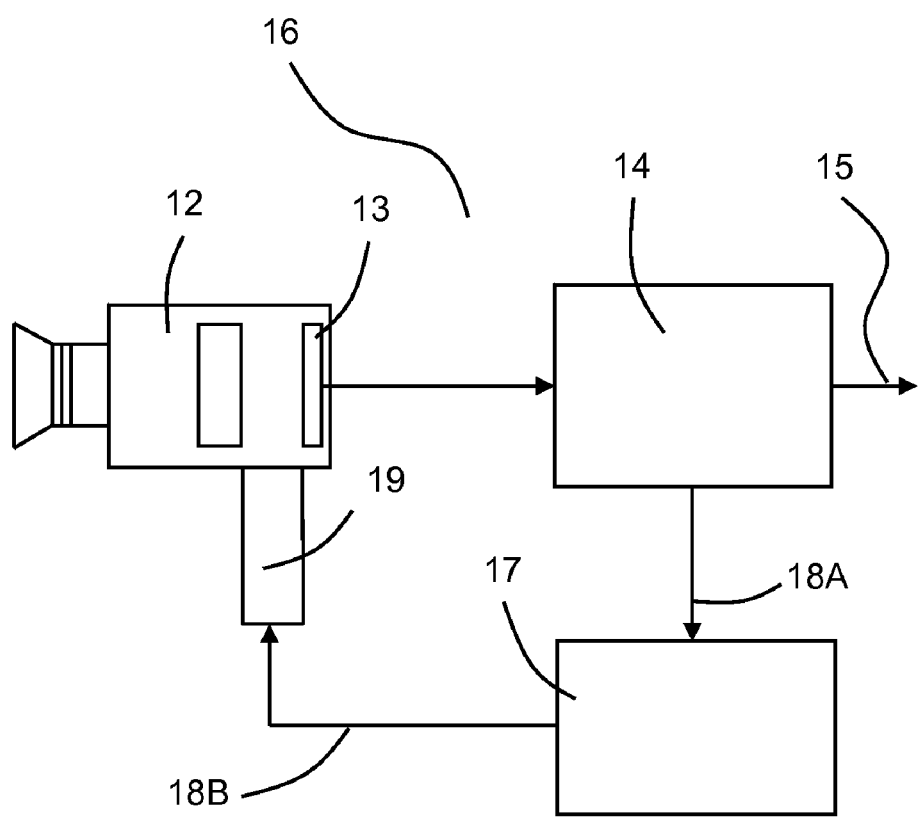
Figure 2A:
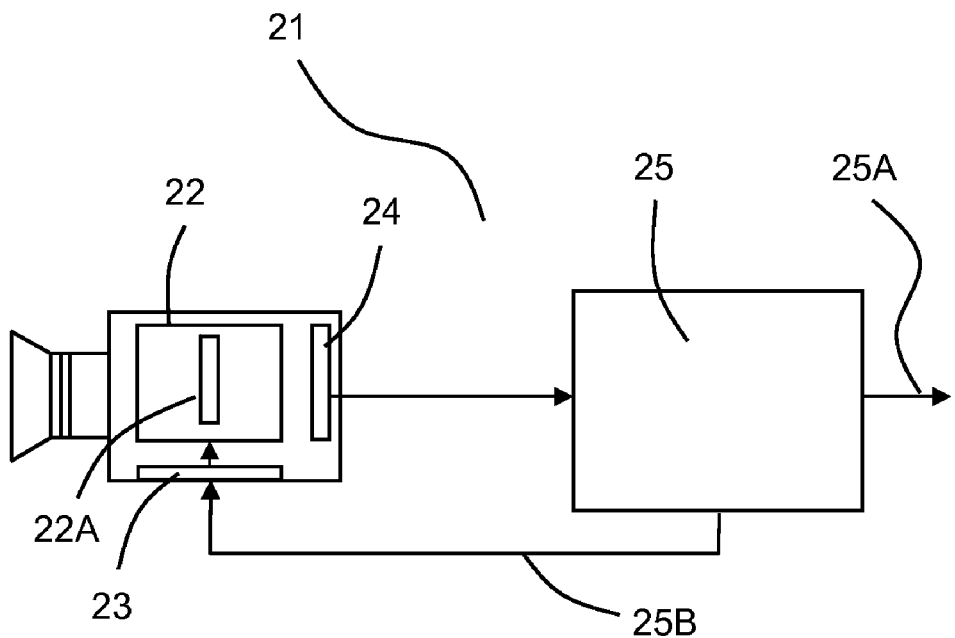
FIG. 2 is block diagrams of optical tracking devices according to the embodiments of the present invention.

FIGS. 2 (2a~2b) are block diagrams of optical tracking devices according to the embodiments of the present invention. In one embodiment depicted in FIG. 2a, the optical tracking device 21 of this invention comprises a lens unit 22, a control circuitry 23 communicatively coupled to the lens unit 22, and an imaging unit, comprising at least one image sensor 24, optically coupled to the lens unit 22. The lens unit 22 comprises at least one Micromirror Array Lens 22A comprising a plurality of micromirrors, configured to focus a scene image onto the image sensor 24 by forming a plurality of optical surface profiles. The control circuitry 23 is configured to control the motions of micromirrors in the Micromirror Array Lens 22A to form optical surface profiles for changing at least one focusing property of the lens unit 22. The focusing property of the lens unit 22 can be an effective focal length, an optical axis, a magnification, or a field of view of the lens unit 22. The image sensor 24 in the optical tracking device 21 is configured to receive a scene image formed by the lens unit 22 to generate the image information of the scene image.

The optical tracking device 21 of the invention further comprises an image processing unit 25, communicatively coupled to the image sensor 24, configured to process the image information from the imaging sensor 24 and generate an output signal 25A including image data and position information of a target. The image processing unit 25 may include a target identification algorithm. The image processing unit 25 also generates a control signal 25B for the control circuit 23 to control the lens unit 22. Using the processed image information, the image processing unit 25 determines a next action that has to be performed by the lens unit 22 and generates the control signal 25B for the control circuit 23, accordingly.

Figure 2B:
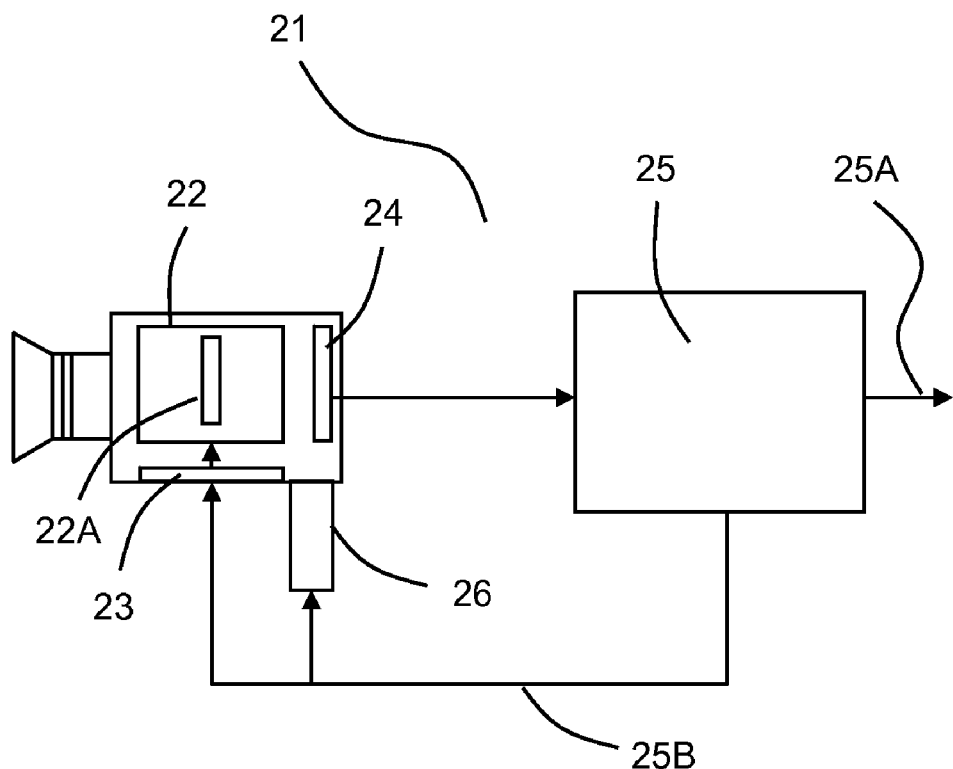

The optical tracking device 21 may further comprise a mechanical movement unit 26 as shown in FIG. 2b, communicatively coupled to the image processing unit 25, configured to mechanically adjust the attitude of the optical tracking device 21 in response to the control signal 25B in order to adjust the optical axis of the lens unit 22. Although the optical tracking device 21 comprising the Micromirror Array Lens 22A can change the optical axis of the lens unit 22, the mechanical movement unit 26 can be combined for a larger tracking area.

Figure 3:
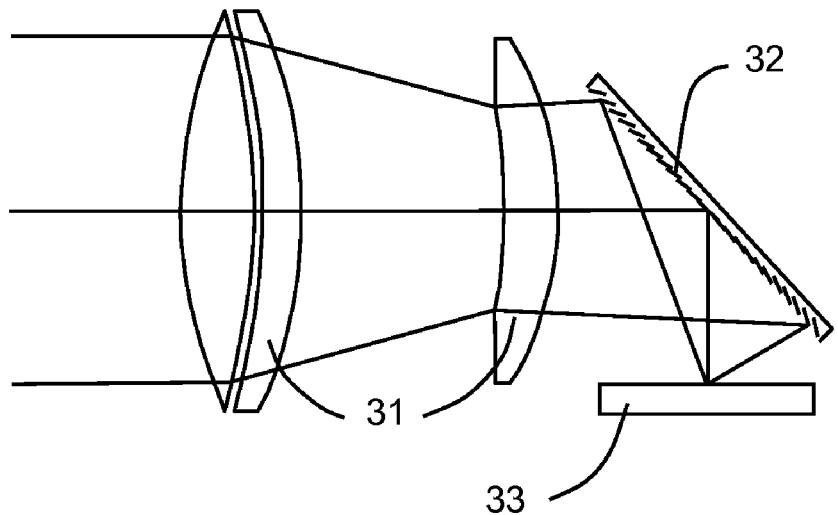
FIG. 3 is a schematic diagram showing an optical tracking system using a Micromirror Array Lens according to the present invention.

FIG. 3 is a schematic diagram showing an optical tracking system using a Micromirror Array Lens according to the present invention. In this embodiment, the lens unit includes an objective lens group 31 configured to receive a scene image and a Micromirror Array Lens 32 optically coupled to the objective lens group 31 and configured to focus the scene image received from the objective lens group 31. The configuration of the lens unit shown in FIG. 3 is exemplary only. Therefore, the lens unit may include any number of lenses or lens groups and have different lens shapes. Furthermore, the lens unit may be combined with a conventional zoom type or telescope type imaging system. An image sensor 33 is optically coupled to the Micromirror Array Lens 32, configured to sense the scene image focused by the Micromirror Array Lens 32. The image sensor 33 may be a CCD, CMOS APS or other types of image sensors.

Figures 4A, 4B:
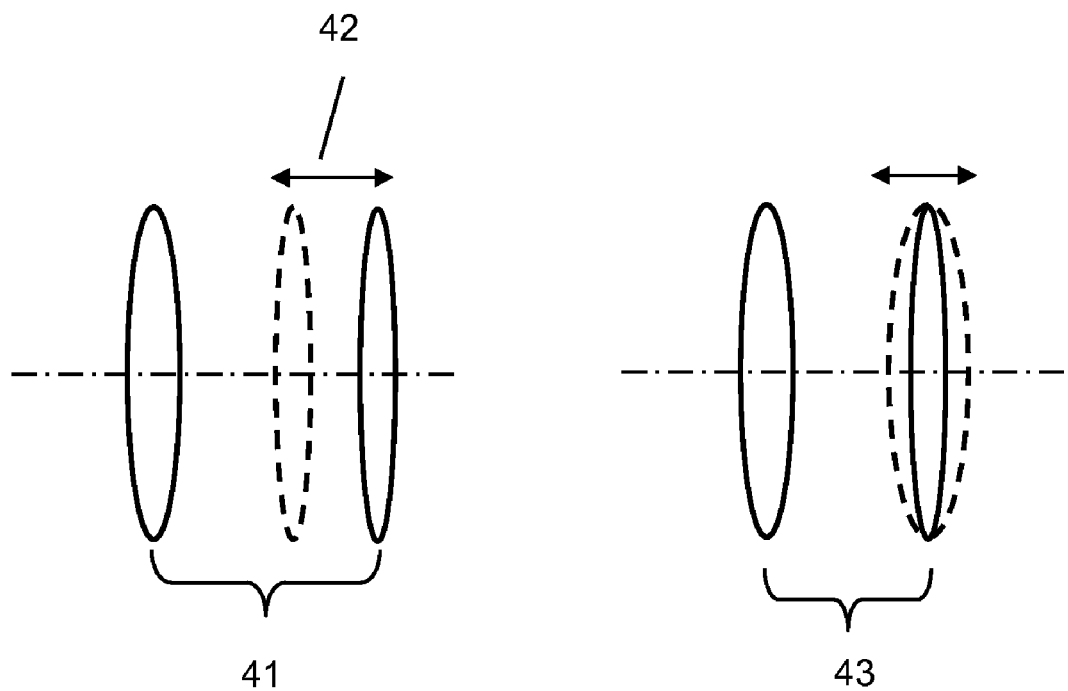
FIG. 4 is a schematic diagram showing a conventional imaging system having a variable focal length.

FIGS. 4 (4a~4b) are a schematic diagram showing a conventional imaging system having a variable focal length. FIG. 4a is a fixed focal length lens group 41 having macroscopic mechanical lens movements 42. The fixed focal length lens or lens group 41 having macroscopic mechanical lens movements 42 can change the effective focal length of the imaging system by traversing some lenses macroscopically. The fixed focal length lens or lens group 41 having macroscopic mechanical lens movements 42 has a slow response time and requires a complicated driving mechanism. Also, the fixed focal length lens or lens group 41 having macroscopic mechanical lens movement 42 has a limited variable focusing property because it cannot change its optical axis. FIG. 4b is a non-MMAL variable focus lens 43 such as liquid crystal lenses. The focal length of the non-MMAL variable focus lens 43 can be changed, for example, by changing its refractive index, without macroscopic mechanical lens movements. However, the non-MMAL variable focus lens 43 has a limited variable focusing property because it has a slow response time and cannot change its optical axis.

Figures 5A, 5B:
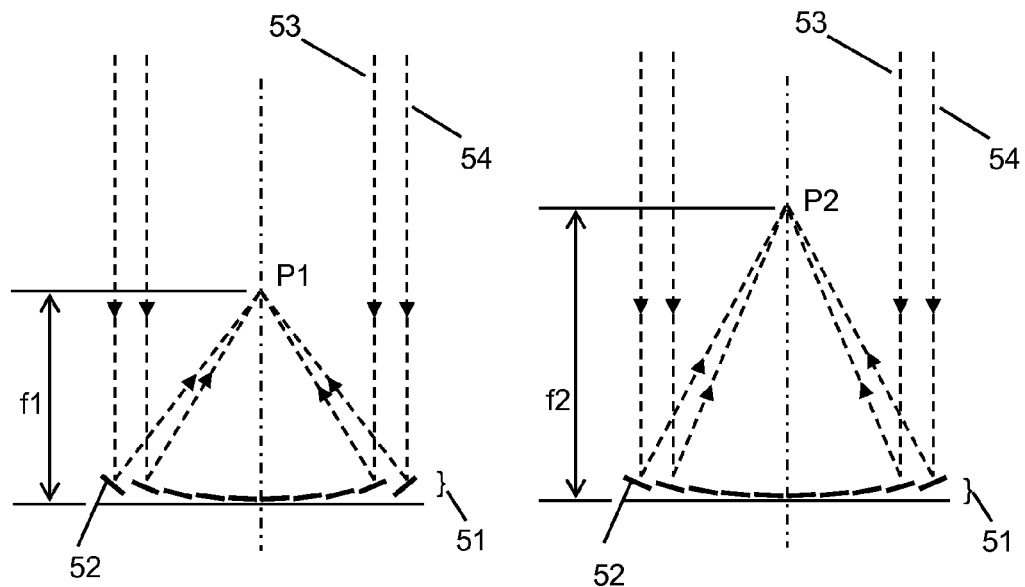
FIG. 5 is a schematic diagram showing a Micromirror Array Lens having a variable focal length according to the present invention.

FIGS. 5 (5a~5b) are a schematic diagram showing a Micromirror Array Lens having a variable focal length according to the present invention. The Micromirror Array Lens 51 comprises a plurality of micromirrors 52. The Micromirror Array Lens 51 forms optical surface profiles by controlling the rotation and/or translation of the micromirrors 52. Each optical surface profile has a corresponding focal length. In FIG. 5a, the Micromirror Array Lens 51 forms an optical surface profile having a focal length $f_1$ by controlling the rotation and/or translation of the micromirrors 52, wherein arbitrary scattered lights 53 and 54 are converged into one point $P_1$ on a focal plane. In FIG. 5b, the Micromirror Array Lens 51 forms an optical surface profiles having a focal length $f_2$ by controlling the rotation and/or translation of the micromirrors 52, wherein arbitrary scattered light 53 and 54 are converged into the one point $P_2$ on the other focal plane. The Micromirror Array Lens 51 having a variable focal length allows an optical tracking system using the Micromirror Array Lens 51 to have a variable effective focal length, a variable field of view, and a variable magnification.

In order to provide a high-resolution image, an optical tracking device must have a narrow field of view. However, as the field of view decreases, the capturing area of the tracking system becomes narrow, and the object being tracked may be lost more easily, resulting in increase in the tracking dropout rate. In order to reduce the tracking dropout rate, the field of view of the tracking system must be increased to broaden the capturing area.

Figure 6:
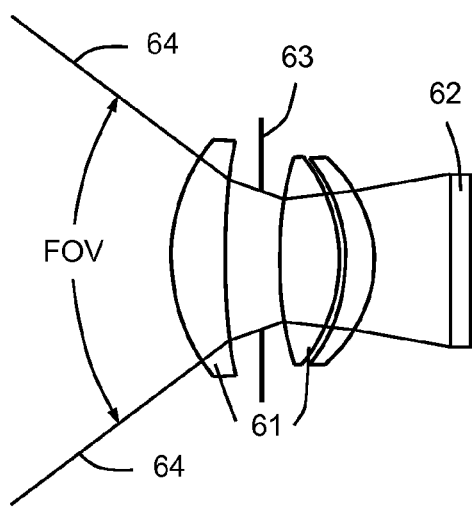
FIG. 6 is a schematic diagram showing a field of view of a conventional imaging system.

FIG. 6 is a schematic diagram showing a field of view of a conventional imaging system. Lens groups 61 are optically coupled to an image sensor 62. A stop 63 is coupled to the lens groups 61. A light ray 64 passes the edge of the stop 63. The field of view of the imaging system is determined by the relative position and/or size of the lens groups 61, the stop 63, and the image sensor 62. In the conventional imaging system, the relative positions of the lens groups 61, the stop 63, and the image sensor 62 are usually adjusted by the mechanical driving system of elements. It is difficult to use the conventional imaging system to track a fast moving target because the response time of the mechanical driving system is slow.

The optical tracking system of the present invention has a variable field of view according to the present invention. A Micromirror Array Lens of the present invention can change its focal length very fast. The rapid focal length change of the Micromirror Array Lens enables the optical tracking device to use a time-sharing technique, wherein both a narrow field of view image and a wide field of view image are provided within a short time period. The time-sharing technique makes the tracking dropout rate of the target reduced while a high-resolution image is maintained. Also, the rapid focal length change of the Micromirror Array Lens enables the optical tracking device to maintain focus on a fast moving target. The principles of maintaining focus on a fast moving target are described in detail in U.S. patent Ser. No. 10/896,146.

Figure 7A:
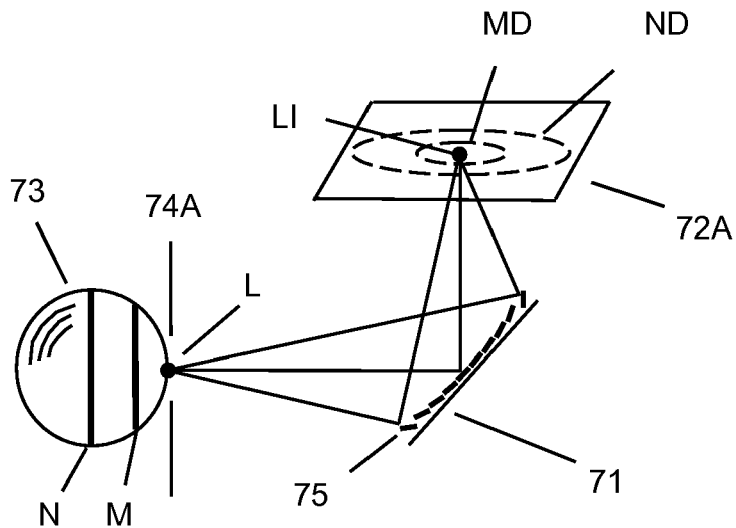
FIG. 7 is a schematic diagram showing an imaging system providing three-dimensional image information according to the present invention.
Figure 7B:
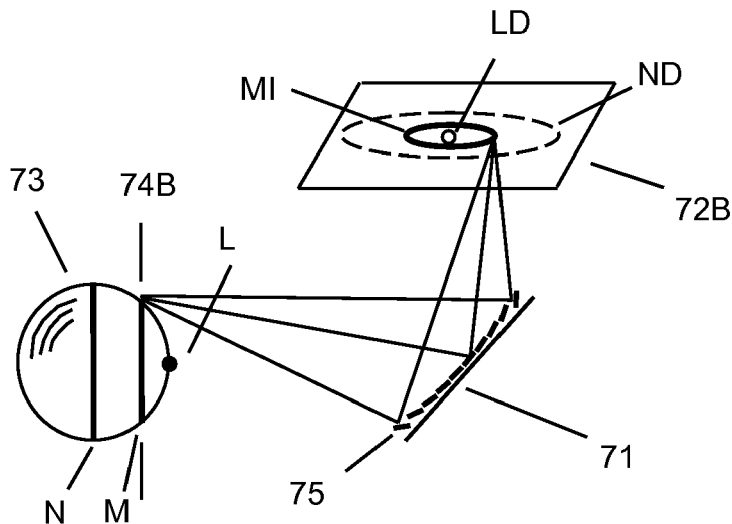
Figure 7C:
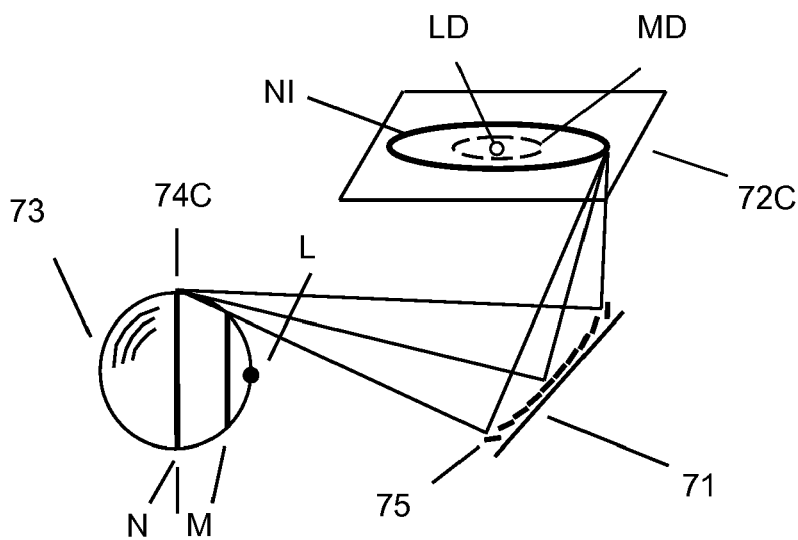

The optical tracking device using a Micromirror Array Lens can provide three-dimensional image information. Therefore, the optical tracking device using Micromirror Array Lenses provides the three-dimensional image information of a target. FIG. 7 is a schematic diagram showing an optical tracking system providing three-dimensional image information according to the present invention. A Micromirror Array Lens 71 forms two-dimensional images 72A, 72B, and 72C by changing the focal length of the Micromirror Array Lens 71. Captured two-dimensional images 72A, 72B, and 72C have different in-focus pixels because the in-focus plane in an object 73 is varied as the focal length of the Micromirror Array Lens 71 is varied. The captured two-dimensional image 72A with the first focal length has an in-focus image LI which is the image of the portion L of the object 73. The portion L of the object 73 lies on the in-focus plane 74A while images MD, ND of portion M, N of the object 73 are defocused. Therefore, the image processing unit can extract the in-focus pixels LI from the captured two-dimensional images 72A and generate a depthwise image, which contains only in-focus pixels. The distance between the in-focus plane 74A in the object and the lens unit can be estimated by using known lens unit parameters including the focal length and distance between the Micromirror Array Lens 71 and the image plane. The captured two-dimensional images 72B and 72C with the second and the third focal lengths have in-focus images MI, NI, which are the images of the portions M, N of the object 73, respectively and the portions M, N of the object 73 lies on the in-focus plane 74B, 74C, respectively. The captured two-dimensional images 72B and 72C are processed in the same manner as the first captured two-dimensional image 72A to provide depthwise images and depth information for each depthwise image. The focal length of the Micromirror Array Lens 71 is changed by controlling the rotation and/or translation of each the micromirror 75 using electrostatic and/or electromagnetic force. For any given focal length, the lens unit can have only one in-focus plane in the object, which may lead to infinitesimal focal length changes with infinite number of steps to provide an all-in-focus image. In practice, the lens unit has a depth of field, which is the distance from near to far that the object appears to be in-focus. In this invention, the imaging processing unit extracts substantially in-focus pixels from the captured two-dimensional image that appears to be in-focus.

The focal (focused) plane of the lens unit is changed by changing the focal length of each Micromirror Array Lens. An imaging unit includes one or more two-dimensional image sensors that taking an original two-dimensional image at each focal plane. An image processing unit generates the all-in-focus image and the depth information for in-focus image from original two-dimensional images. All the processes are achieved within a unit time which is less than or equal to the afterimage time of the human eye. By changing the focal length of the lens unit in multiple steps, a single camera system using a Micromirror Array Lens can provide three-dimensional image information about a target.

Figure 8A:
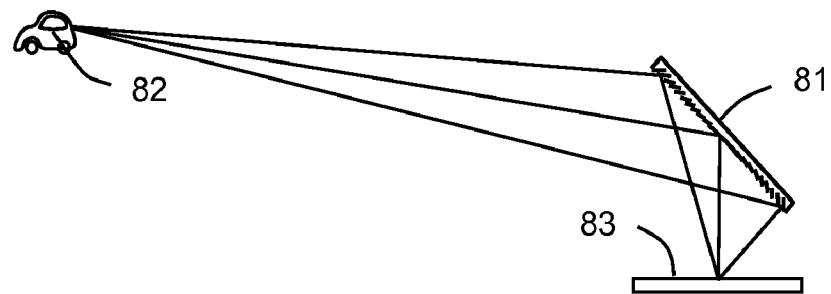
FIG. 8 is schematic illustrations showing that an optical tracking device according to the present invention tracks a target by changing an optical axis of a lens unit.
Figure 8B:
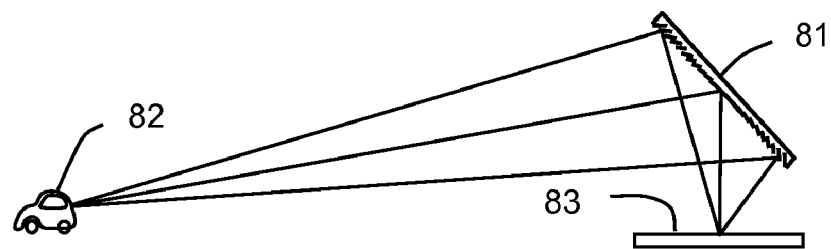

FIGS. 8 (8a~8b) are schematic illustrations showing that an optical tracking device according to the present invention tracks a target by changing an optical axis of a lens unit. The optical axis of the lens unit is adjusted by changing the optical axis of the Micromirror Array Lens 81. By adjusting the optical axis of the lens unit, the optical tracking device may image a target 82 at any location in the image sensor without the attitude adjustment of the optical tracking device. Thus, it is not necessary to use a servo or gimbal system to control the attitude of the optical tracking device. FIGS. 8a-8b shows the target at two different times imaged at the center of the image sensor 83. The target 82 can be tracked in a high speed by changing the optical axis of the Micromirror Array Lens 81 because the response time of the Micromirror Array Lens 81 is very fast. Also, The rapid change of the optical axis of the Micromirror Array Lens 81 allow the optical tracking device to track a fast moving target with a low tracking dropout rate.

Figures 9A, 9B:
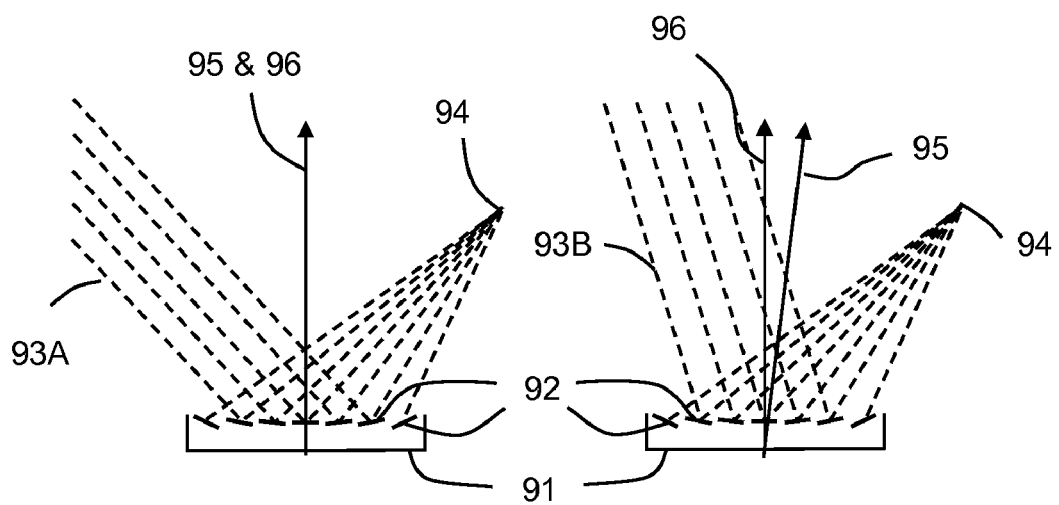
FIG. 9 is schematic diagrams showing a Micromirror Array Lens having a variable optical axis according to the present invention.

FIGS. 9 (9a~9b) are schematic diagrams showing a Micromirror Array Lens having a variable optical axis according to the present invention. A Micromirror Array Lens 91 comprises micromirrors 92. Light rays 93A, 93B are focused onto a point 94. In FIG. 9a, the optical axis 95 has the same direction as a vector 96 normal to the plane of the Micromirror Array Lens 91. In FIG. 9b, the optical axis 95 has a different direction from the vector 96 normal to the plane of the Micromirror Array Lens 91. As shown in FIGS. 9a-9b, by changing the optical axis of the Micromirror Array Lens 91 by controlling each micromirror 92, the Micromirror Array Lens 91 can focus two different rays 93A, 93B with different incident angles to the normal vector of a Micromirror Array Lens on the same point 94.

Figure 10:
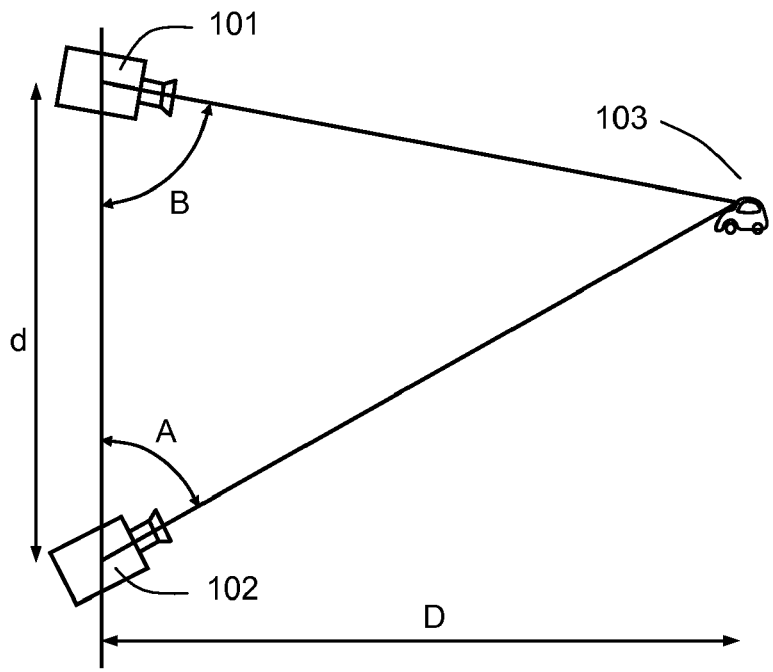
FIG. 10 is a schematic diagram showing a conventional imaging system using two conventional cameras to provide distance information of a target.

The optical tracking device of the present invention is capable of providing distance information. FIG. 10 is a schematic diagram showing a conventional imaging system using two conventional cameras to provide distance information of a target. A first camera 101 is placed at a distance d away from a second camera 102. The first camera 101 and the second camera 102 track a target 103. In order to track the target 103, the first camera 101 is positioned at an angle B with respect to a vertical axis and the second camera 102 is positioned at an angle A with respect to the vertical axis. The horizontal distance D from the first cameras 101 and the second camera 102 to the target 103 is determined using the formula:

$$D = \left(\frac{\tan A \times \tan B}{\tan A + \tan B}\right)d$$

The imaging system using the conventional distance acquisition method tends to be bulky and expensive because multiple cameras are required.

Figure 11A:
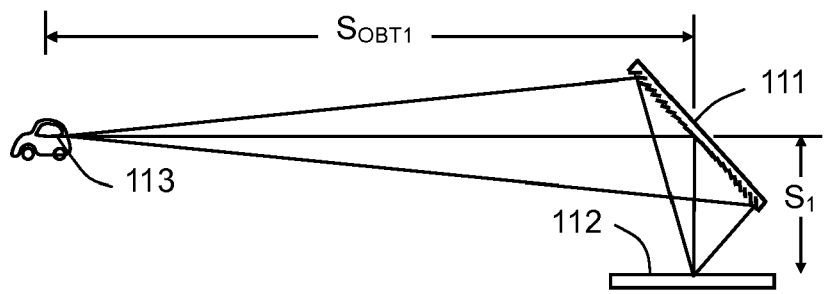
FIG. 11 is a schematic diagrams showing an optical tracking system providing distance information of a target at two different times according to the present invention.
Figure 11B:
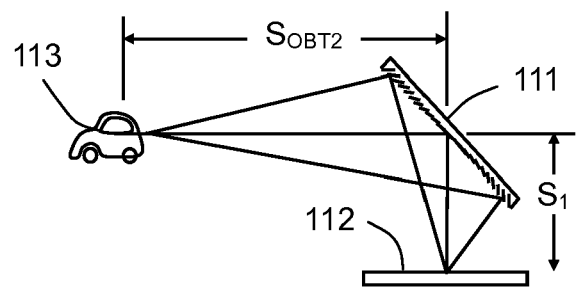

FIGS. 11 (11a~11b) are a schematic diagrams showing an optical tracking system providing distance information of a target at two different times according to the present invention. A lens unit comprises at least one Micromirror Array Lens 111 and is optically coupled to an image sensor 112. The distance from the center of the lens unit 111 to the image sensor 112 is $S_I$. The distance from the center of the lens unit 111 to the target 113 is $S_{OBT1}$ at time $t_1$, as shown in FIG. 11a and $S_{OBT2}$ at time $t_2$, as shown in FIG. 11b. By fixing the distance ($S_I$) from the center of the lens unit 111 to the image sensor 112, and controlling the effective focal length (f) of the lens unit 111, the distance to the target 113 ($S_{OBT}$) may be determined using the formula:

$$1/f = 1/S_{OBT} + 1/S_I$$

The optical tracking system using the Micromirror Array Lens 111 can provide the distance information of the target with a simpler structure and low cost.

Figure 12:
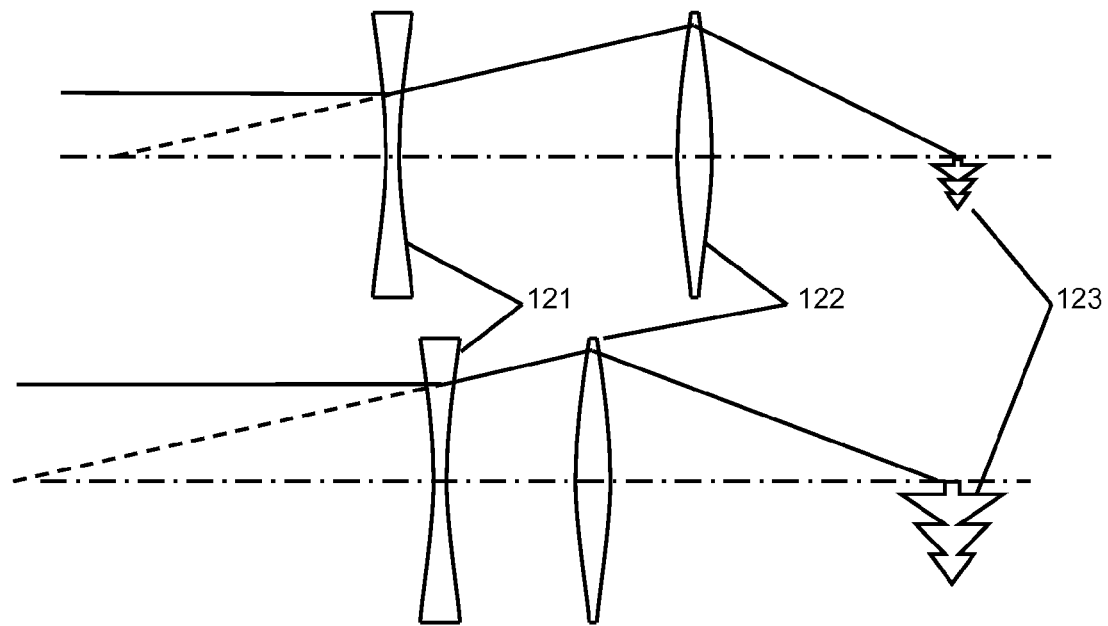
FIG. 12 is a schematic diagram showing a conventional mechanically controlled zoom type imaging system having a variable magnification.

The optical tracking device of the present invention is capable of providing a variable magnification. FIG. 12 is a schematic diagram showing a conventional mechanically controlled zoom type imaging system having a variable magnification. At the very basic level, a zoom type optical tracking device includes at least one moving lens for zooming. One lens or lens group to change the magnification of the imaging system is called a variator 121 and another lens or lens group to maintain focus throughout a zoom range is called a compensator 122. When the variator 121 is moved to change the magnification, the image is defocused because the position of an image plane is also changed. Therefore, the compensator 122 must be moved in unison with the variator 122 to zoom and keep the image 123 in-focus. These lens movements are usually mechanically controlled by a zoom ring on the lens barrel.

Figure 13:
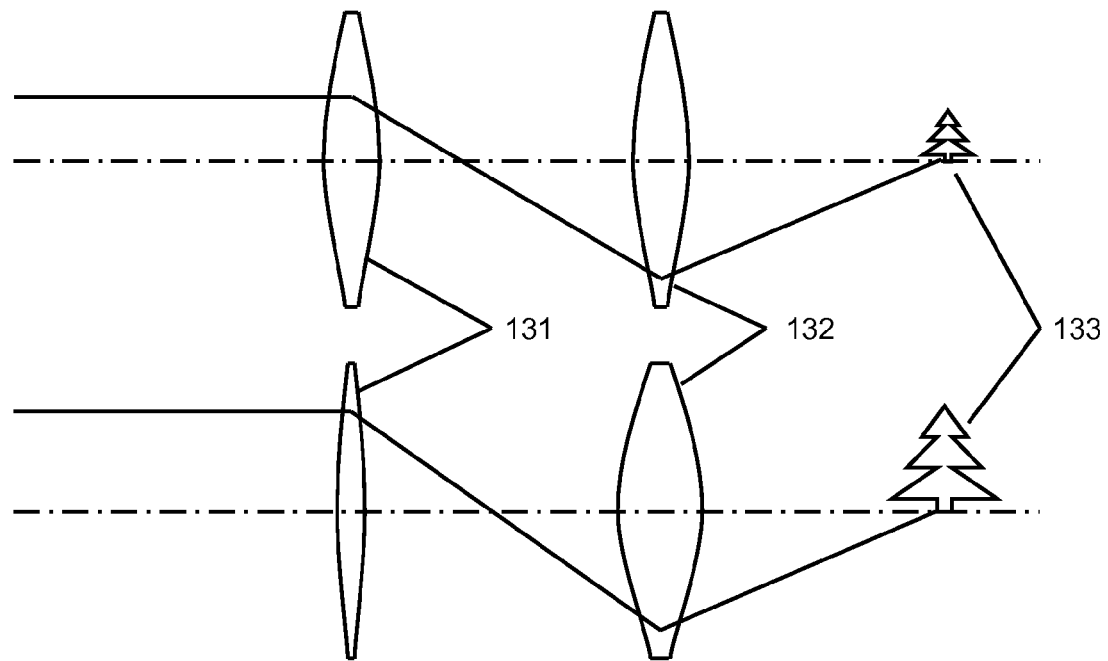
FIG. 13 is a schematic diagram showing a zoom type optical tracking device using at least one variable focal length lens.

FIG. 13 is a schematic diagram showing a zoom type optical tracking device using at least one variable focal length lens, wherein the focal length of the variable focal length lens is changed without macroscopic mechanical lens movements. In the embodiment shown in FIG. 13, the zoom type optical tracking device includes a first variable focal length lens 131 and a second variable focal length lens 132. The first variable focal length lens 131 changes the magnification of a lens unit. But, the image is defocused because the position of an image plane is also changed. Therefore, the focal lengths of the two variable focal length lenses 131 and 132 must be changed in unison to change the magnification of the lens unit and keep the image 133 in-focus. Unlike the conventional mechanically controlled zoom type imaging system shown in FIG. 12, the zoom type optical tracking device using variable focal length lenses can change the magnification of the lens unit without macroscopic mechanical lens movements. Although these variable focal length lenses 131, 132 are illustrated as refractive lenses in FIG. 13, the same principle can be also applied to reflective type variable focal length lenses such as Micromirror Array Lenses of the present invention as will be shown in FIGS. 14-18.

FIGS. 14-18 illustrate exemplary embodiments of the optical tracking device having zoom type configurations.

Figure 14A:
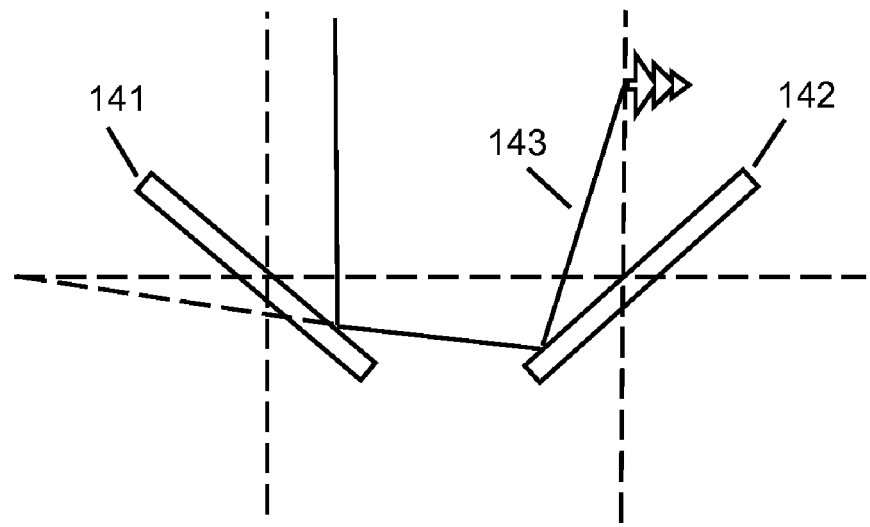
FIG. 14 is a schematic diagram showing a zoom type optical tracking device using at least two Micromirror Array Lenses according to one embodiment of the present invention.

FIGS. 14 (14a~14b) are a schematic diagram showing a zoom type optical tracking device using at least two Micromirror Array Lenses according to one embodiment of the present invention. The Micromirror Array Lenses are used as variable focal length lenses 131 and 132 shown in FIG. 13. Since the Micromirror Array Lenses are reflective types, it is impossible to make an in-line optical arrangement. In FIG. 14a, a first Micromirror Array Lens 141 and a second Micromirror Array Lens 142 are positioned so that the path of the light 143 reflected by the first Micromirror Array Lens 141 and the second Micromirror Array Lens 142 is not blocked by other components. This arrangement can reduce the total size of the zoom type optical tracking device.

Figure 14B:
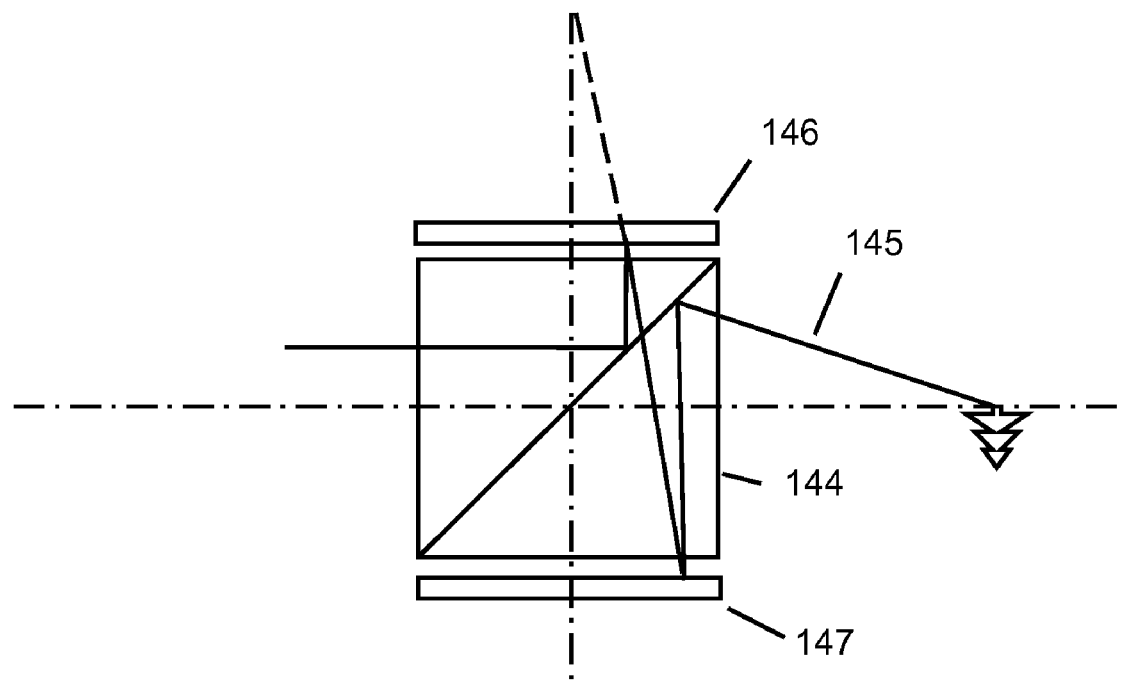

Alternatively, additional optical elements can be added to make the in-line optical arrangement for the zoom type optical tracking device as shown in FIG. 14b. The zoom type optical tracking device includes a beam splitter 144 positioned in the path of light 145 between a first Micromirror Array Lens 146 and a second Micromirror Array Lens 147. The beam splitter 144 changes the direction of the light 145 by 90 degrees, and thus simulates an in-line optical arrangement. The total size of the zoom type optical tracking device in FIG. 14b is smaller than a conventional controlled zoom type imaging system because necessary separation requirements between a variator and a compensator and between a compensator and an imaging sensor can be satisfied by a beam splitter 144 and the Micromirror Array Lenses 146 and 147 in a small space.

Since the positions of Micromirror Array Lenses 141, 142, 146, and 147 need not be changed, the zoom type optical tracking devices in FIGS. 14a and 14b do not need space for lens movements, thus the zoom type optical tracking device can be manufactured in a compact size. Also, the power consumption of the zoom type optical tracking device of the present invention is minimal since there are no macroscopic mechanical lens movements.

Even though the zoom type optical tracking devices using Micromirror Array Lenses are explained with two lenses, actual zoom type optical tracking devices using Micromirror Array Lenses also may have additional lens groups to get necessary and auxiliary performances of the zoom type optical tracking device. The zoom type optical tracking devices may comprise at least one of a focus lens group, a variator lens group, a compensator lens group, an elector lens group, and a relay lens group.

Figure 15:
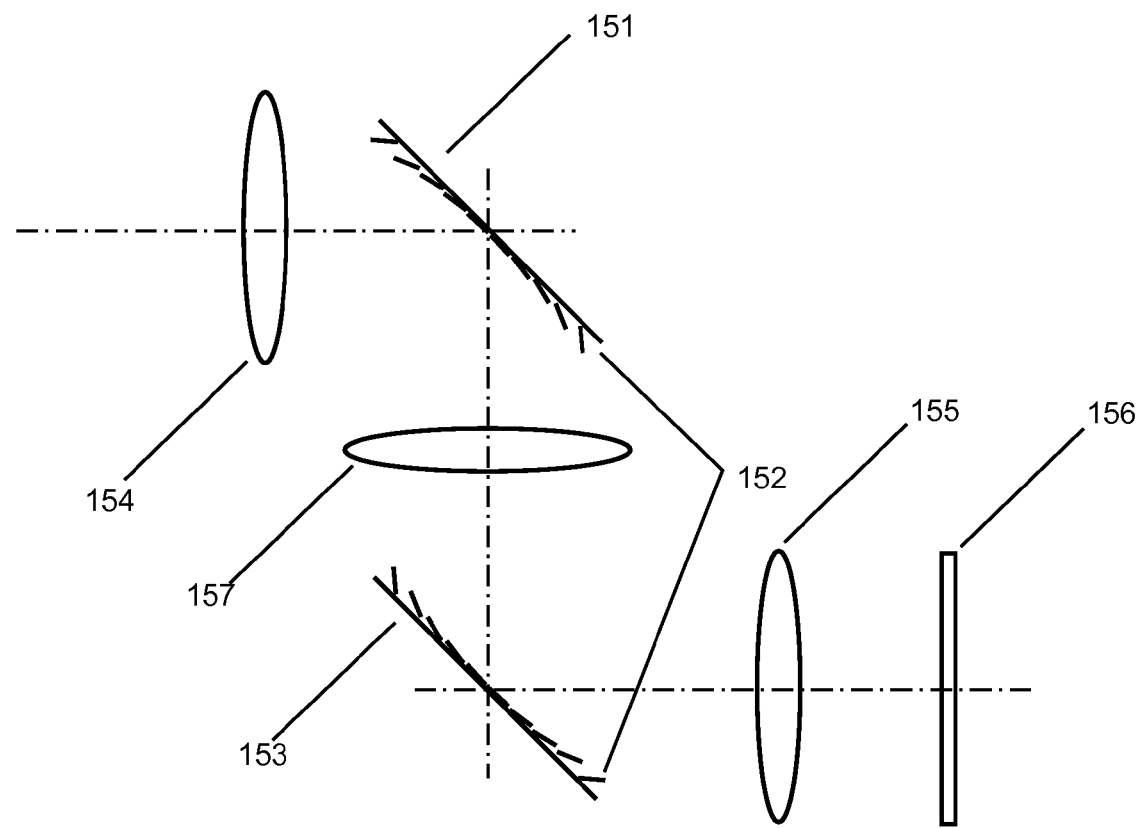
FIG. 15 are a schematic diagram showing a zoom type optical tracking device using at least two Micromirror Array Lenses according to the other embodiment of the present invention.

FIG. 15 is a schematic diagram showing a zoom type optical tracking device using at least two Micromirror Array Lenses according to the other embodiment of the present invention. The lens unit of the zoom type optical tracking device comprises a first Micromirror Array Lens 151 comprising a plurality of micromirrors 152 and a second Micromirror Array Lens 153 comprising a plurality of micromirrors 152, wherein the second Micromirror Array Lens 153 is optically coupled to the first Micromirror Array Lens 151.

The lens unit may further comprise a first auxiliary lens group 154 and a second auxiliary lens group 155. In figures, lens groups are schematically illustrated by a lens for simplicity. It should be noted that in practice, each lens group may include a different kind and different number of lenses to satisfy system requirements. The first auxiliary lens group 154 is a focus lens group to bring the image into focus. The first Micromirror Array Lens 151 is a variator to change at least one focusing property of the lens unit by controlling the rotation and/or translation of micromirrors 152. The second Micromirror Array Lens 153 is a compensator to maintain focus by controlling the rotation and/or translation of micromirrors 152. The second auxiliary lens group 155 is a relay lens group to focus the image onto an image sensor 156. The focusing properties of the lens unit include the effective focal length, the optical axis, the magnification, and the field of view of the lens unit. Further, each micromirror 152 of the Micromirror Array Lenses 151 and 153 can be controlled to compensate for the aberration of the optical tracking device. In one alternative embodiment, the first Micromirror Array Lens 151 is used as a compensator to maintain focus while the second Micromirror Array Lens 153 is used as a variator to change at least one focusing property of the lens unit by controlling the micromirrors 152. In another alternative embodiment, the first Micromirror Array Lens 151 and the second Micromirror Array Lens 153 both change at least one focusing property of the lens unit and maintain focus altogether by controlling the micromirrors 152. Since the zoom type optical tracking device of the present invention does not have macroscopic moving elements, the zoom type optical tracking device can be built in a simple and compact structure with low power consumption, low cost, and high speed tracking.

Figure 16:
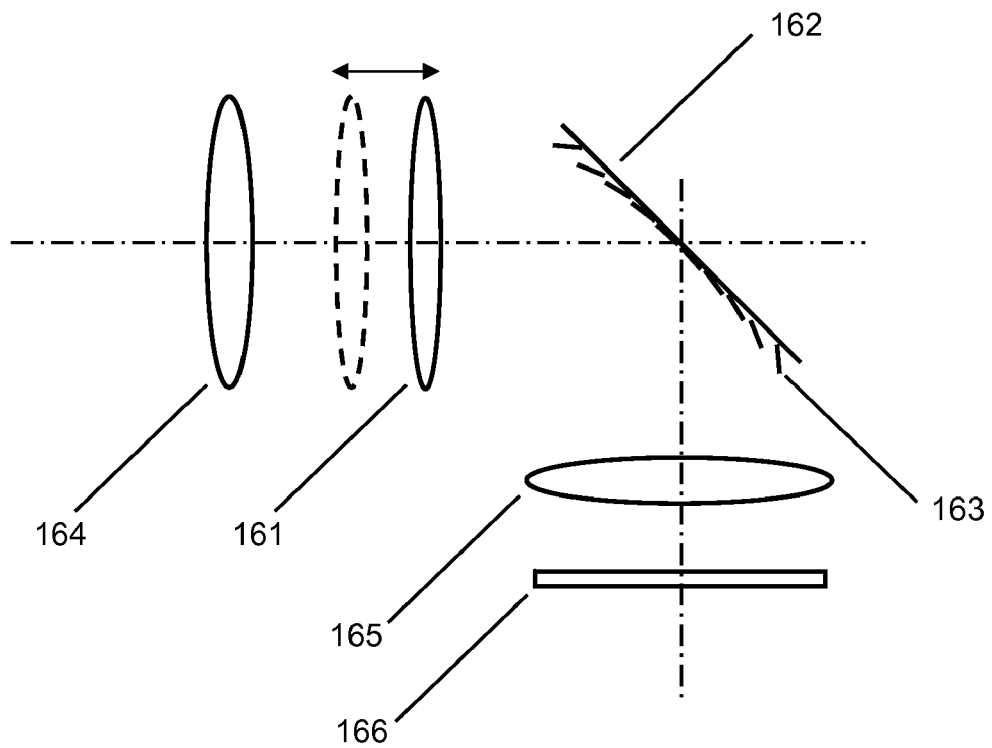
FIG. 16 is a schematic diagram showing a zoom type optical tracking device using at least one Micromirror Array Lens and a fixed focal length lens or lens group having macroscopic mechanical lens movements according to the embodiment of the present invention.

FIG. 16 is a schematic diagram showing a zoom type optical tracking device using at least one Micromirror Array Lens and a fixed focal length lens or lens group having macroscopic mechanical lens movements according to the embodiment of the present invention. The lens unit of the zoom type optical tracking device comprises a fixed focal length lens or lens group 161 having macroscopic mechanical lens movements and a Micromirror Array Lens 162 comprising a plurality of micromirrors 163, wherein the Micromirror Array Lens 162 is optically coupled to the fixed focal length lens or lens group 161.

The lens unit may further comprise a first auxiliary lens group 164 and a second auxiliary lens group 165. The first auxiliary lens group 164 is a focus lens group to bring an image into focus. The fixed focal length lens or lens group 161 having macroscopic mechanical lens movements is a variator to change the magnification of the lens unit and the Micromirror Array Lens 162 is a compensator to maintain focus by controlling the rotation and/or translation of the micromirrors 163. The second auxiliary lens group 165 is a relay lens group to focus the image onto an image sensor 166. The optical axis can be changed by controlling rotation and/or translation of micromirrors 163 of the Micromirror Array Lens 162. Each micromirror 163 of the Micromirror Array Lens 162 can be controlled to compensate for the aberration of the optical tracking device. In one alternative embodiment, the Micromirror Array Lens 162 is used as a variator to change at least one focusing property of the lens unit by controlling the micromirrors 163, while the fixed focal length lens or lens group 161 having macroscopic mechanical lens movements is used as a compensator to maintain focus. In another alternative embodiment, the fixed focal length lens or lens group 161 having macroscopic mechanical lens movements and the Micromirror Array Lens 162 both change at least one focusing property of the lens unit and maintain focus by controlling the position of the fixed focal length lens or lens group 161 and/or by controlling the micromirrors 163.

The zoom type optical tracking device may further comprise an additional auxiliary lens group (not shown) as an erector lens group in order to produce an inverted image. Also, the auxiliary lens or lens group can be used for further enhancement of the zoom type optical tracking device. The zoom type optical tracking device may further comprise extra Micromirror Array Lens or Micromirror Array Lenses (not shown) to compensate for the aberration of the optical tracking device. The zoom type optical tracking device may further comprises an optical filter or filters for image enhancement. The zoom type optical tracking device of the present invention has less moving elements than those of conventional zoom type optical tracking devices.

Figure 17:
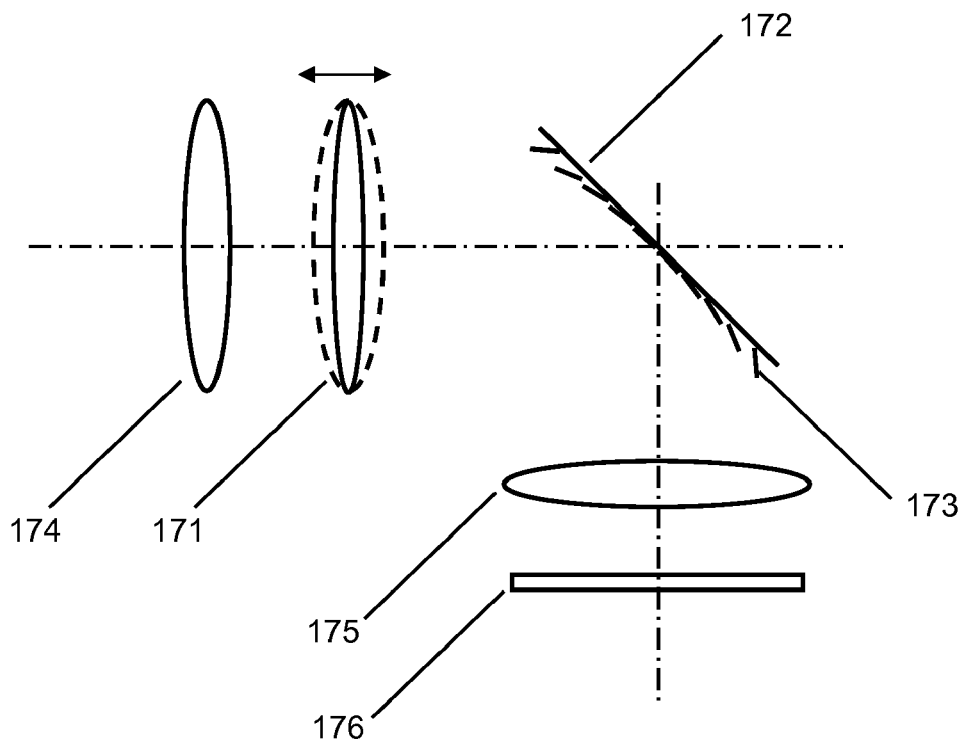
FIG. 17 is a schematic diagram showing a zoom type optical tracking device using at least one Micromirror Array Lens and a non-MMAL variable focus lens according to the embodiment of the present invention.

FIG. 17 is a schematic diagram showing a zoom type optical tracking device using at least one Micromirror Array Lens and a non-MMAL variable focus lens according to the embodiment of the present invention. The lens unit of the zoom type optical tracking device comprises a non-MMAL variable focus lens 171, wherein the focal length of the lens is changed without mechanical motion of lens elements, and a Micromirror Array Lens 172 comprising a plurality of micromirrors 173, wherein the Micromirror Array Lens 172 is optically coupled to the non-MMAL variable focus lens 171. The lens unit may further comprise a first auxiliary lens group 174 and a second auxiliary lens group 175. The first auxiliary lens group 174 is a focus lens group to bring the image into focus. The non-MMAL variable focus lens 171 such as liquid crystal lens is a variator to change the magnification of the lens unit. The Micromirror Array Lens 172 is a compensator to maintain focus by controlling the rotation and/or translation of micromirrors 173. In one alternative embodiment, the Micromirror Array Lens 172 is used as a variator to change at least one focusing property of the lens unit by controlling the micromirrors 173, while the non-MMAL variable focus lens 171 is used as a compensator to maintain focus. In another alternative embodiment, the non-MMAL variable focus lens 171 and the Micromirror Array Lens 172 both change at least one focusing property of the lens unit and maintain focus by controlling the focal length of the non-MMAL variable focus lens 171 and/or by controlling micromirrors 173. The second auxiliary lens group 175 is a relay lens group to focus the image onto an image sensor 176. The optical axis can be changed by controlling rotation and/or translation of micromirrors 173 of the Micromirror Array Lens 172. Each micromirror 173 of the Micromirror Array Lens 172 can be controlled to compensate for the aberration of the optical tracking device. The zoom type optical tracking device may further comprise extra Micromirror Array Lens or Micromirror Array Lenses (not shown) to compensate for the aberration of the optical tracking device. The zoom type optical tracking device using the non-MMAL variable focus lens 171 can have limitations in providing a variable focusing property because the non-MMAL variable focus lens cannot change its optical axis without macroscopic mechanical attitude control system. However, since the zoom type optical tracking device of the present invention does not have macroscopic mechanical lens movements, the zoom type optical tracking device of the present invention can be built in a simple and compact structure with advantages including low power consumption, low cost, and high speed tracking.

Figure 18:
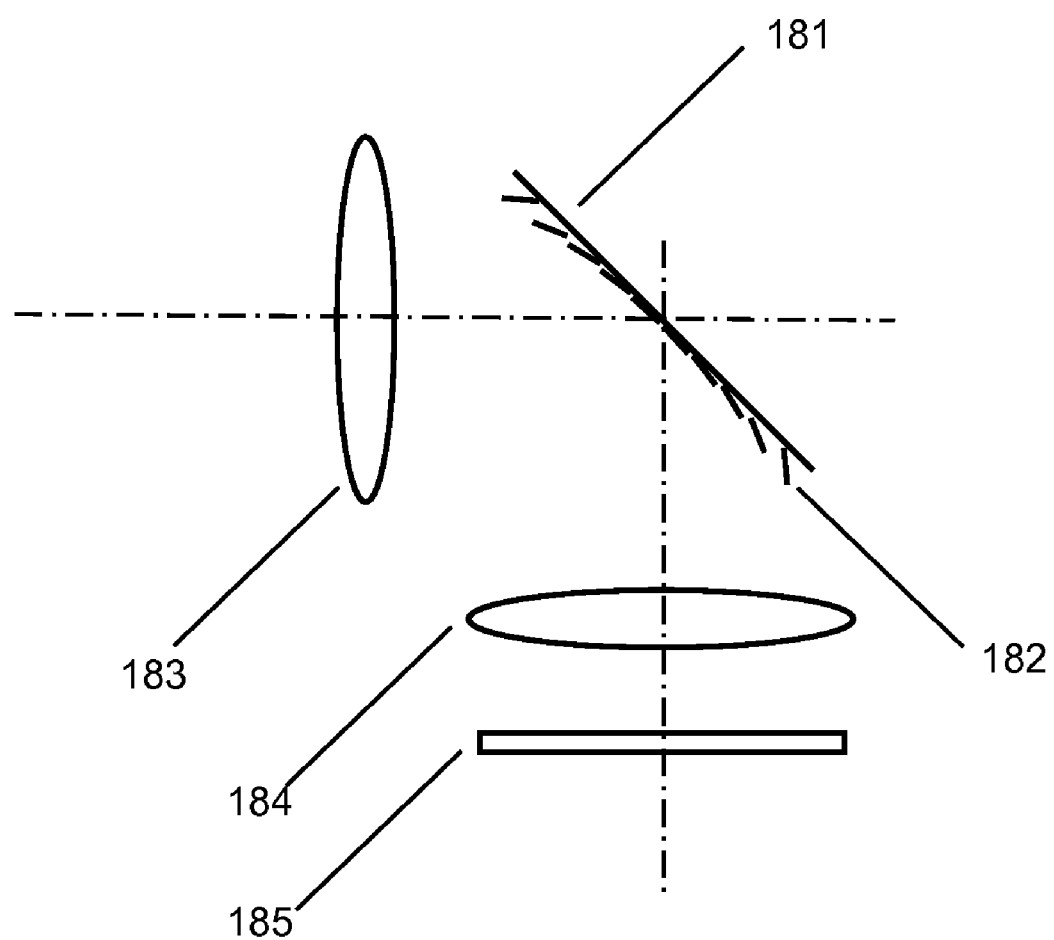
FIG. 18 is a schematic diagram showing a zoom type optical tracking device with a pan focus using at least one Micromirror Array Lens according to the embodiment of the present invention.

FIG. 18 is a schematic diagram showing a zoom type optical tracking device with a pan focus using at least one Micromirror Array Lens according to the embodiment of the present invention. The Micromirror Array Lens 181 comprises a plurality of micromirrors 182. The Micromirror Array Lens 181 changes at least one focusing property of the lens unit by controlling the micromirrors 182. The lens unit may further comprise a first auxiliary lens group 183 and a second auxiliary lens group 184. The first auxiliary lens group 183 is a focus lens group to bring the image into focus. The Micromirror Array Lens 181 is a variator to change at least one focusing property of the lens unit by controlling the rotation and/or translation of micromirrors 182. The second auxiliary lens group 184 is a relay lens group to focus the image onto an image sensor 185. Each micromirror 182 of the Micromirror Array Lens 181 can be controlled to compensate for the aberration of the optical tracking system. This embodiment can be applied to a zoom type optical tracking device having a long depth of focus without introducing compensator lens or lens group. Smaller aperture and longer focal length, longer depth of focus. This embodiment can be advantageously used for a low cost, small zoom type optical tracking device having a long depth of focus such as cellular phone, PDA, and potable computer since it does not require a compensator.

The zoom type optical tracking devices in FIGS. 14-18 may further comprise an additional auxiliary lens group as an erector lens group in order to produce an inverted image (FIG. 15 shows the erector lens group 157). Also, the auxiliary lens or lens group can be used for further enhancement of the zoom type optical tracking device. The zoom type optical tracking device may further comprise extra Micromirror Array Lens or Micromirror Array Lenses to compensate for the aberration of the optical tracking device. The zoom type optical tracking device may further comprises an optical filter or filters for image enhancement.

In stead of using zoom type configurations, the optical tracking device can use telescope type configurations to provide a variable focusing property. Conventional reflecting telescopes typically comprise a primary mirror and a secondary mirror having. These mirrors have a curved or flat surface with a fixed focal length. The primary mirror gathers light and reflects the light to a secondary mirror and the secondary mirror reflects the light to a focal plane. In the conventional telescope type imaging systems, the magnification of a lens unit is changed through additional eyepieces at a cost of resolution while other focusing properties cannot be changed. The telescope type lens unit having the Micromirror Array Lens can provide required focusing properties without or with minimal macroscopic mechanical mirror movements and without changing eyepieces. The micromirror Array Lens can simulate various curved surfaces that are used in conventional reflecting telescopes. The optical surface profile of the Micromirror Array Lens satisfies a convergence condition and a phase matching condition to simulate a flat mirror. The optical surface profile of the Micromirror Array Lens satisfies a convergence condition and a phase matching condition to simulate a parabolic concave mirror. The optical surface profile of the Micromirror Array Lens satisfies a convergence condition and a phase matching condition to simulate a spherical concave mirror. The optical surface profile of the Micromirror Array Lens satisfies a convergence condition and a phase matching condition to simulate a hyperbolic concave mirror. The optical surface profile of the Micromirror Array Lens satisfies a convergence condition and a phase matching condition to simulate an elliptic concave mirror. The optical surface profile of the Micromirror Array Lens satisfies a convergence condition and a phase matching condition to simulate a parabolic convex mirror. The optical surface profile of the Micromirror Array Lens satisfies a convergence condition and a phase matching condition to simulate a spherical convex mirror. The optical surface profile of the Micromirror Array Lens satisfies a convergence condition and a phase matching condition to simulate a hyperbolic convex mirror. The optical surface profile of the Micromirror Array Lens satisfies a convergence condition and a phase matching condition to simulate an elliptic convex mirror.

Figure 19:
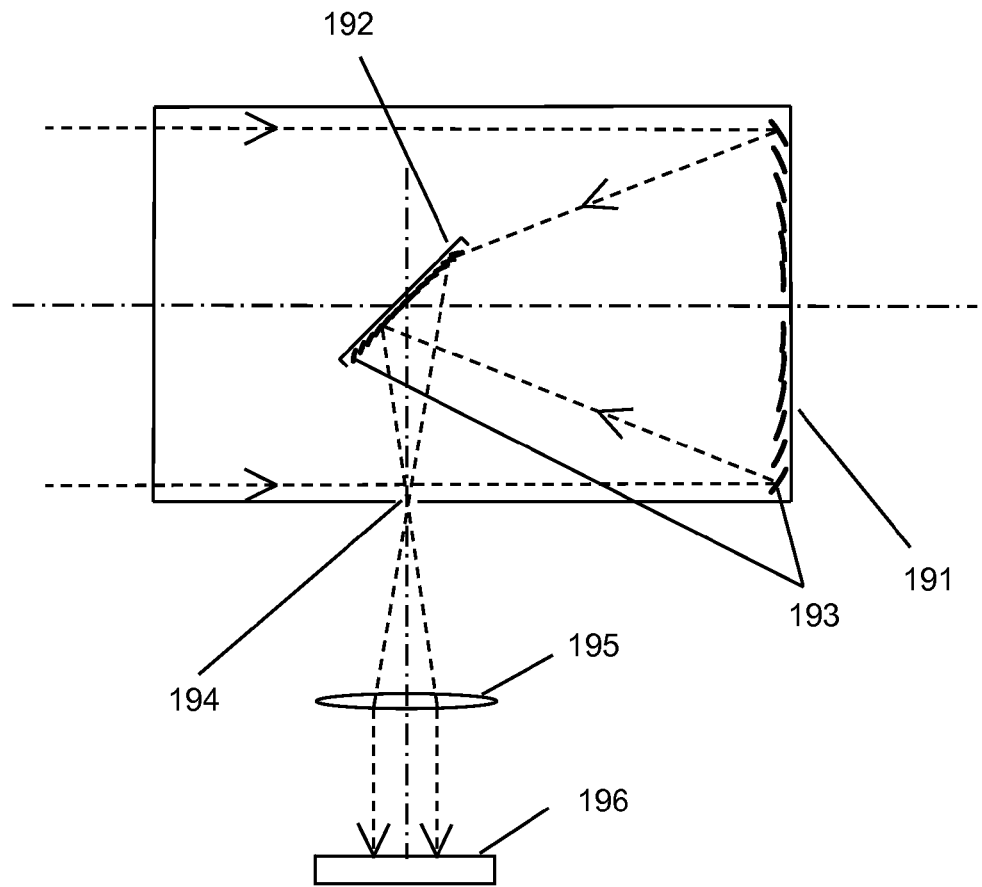
FIG. 19 is a schematic diagram showing a Newtonian telescope type optical tracking device according to the embodiment of the present invention.
Figure 20:
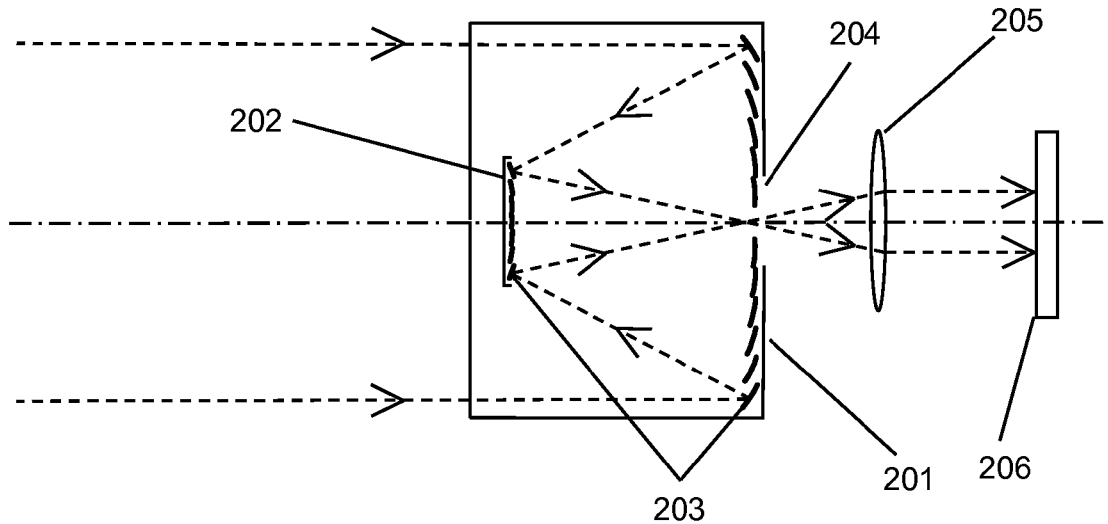
FIG. 20 is a schematic diagram showing a Cassegrain telescope type optical tracking device according to the embodiment of the present invention.
Figure 21:
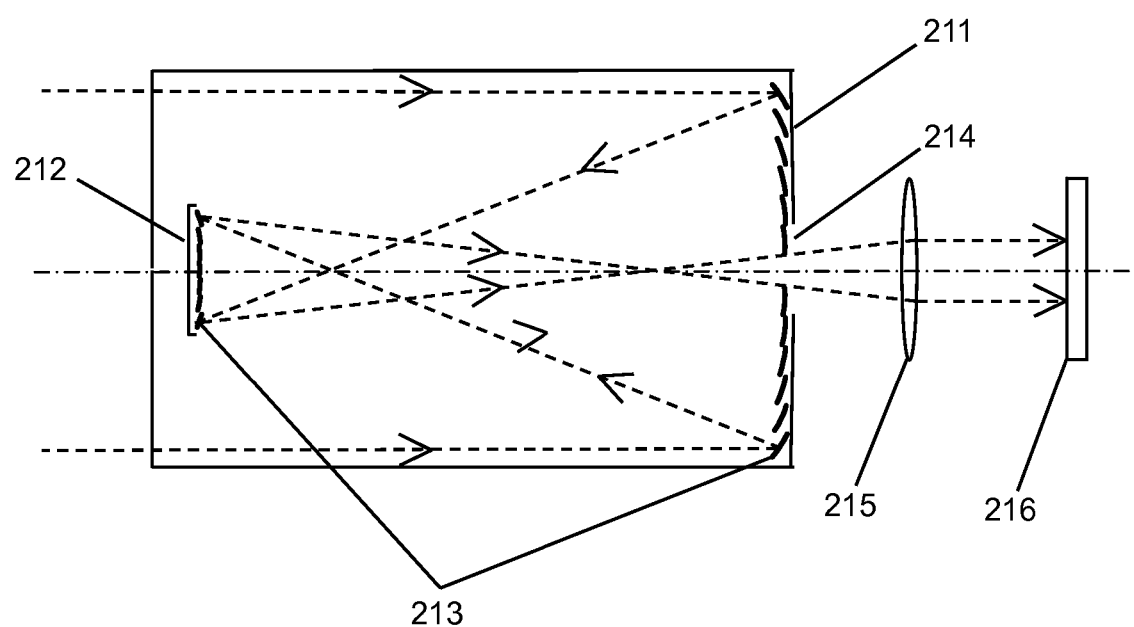
FIG. 21 is a schematic diagram showing a Gregorian telescope type optical tracking device according to the embodiment of the present invention.

FIGS. 19-21 illustrate exemplary embodiments of the optical tracking device having telescope type configurations. FIG. 19 is a schematic diagram showing a Newtonian telescope type optical tracking device according to the embodiment of the present invention. The conventional Newtonian telescope uses a parabolic or spherical concave primary mirror having a fixed focal length and a flat secondary mirror. The primary mirror reflects light to the secondary mirror and the secondary mirror reflects the light to the focal plane through a hole at the side of the telescope tube. The lens unit of the Newtonian telescope type optical tracking device of the present invention comprises a first Micromirror Array Lens 191 comprising a plurality of micromirrors and a second Micromirror Array Lens 192 comprising a plurality of micromirrors 193, wherein the first Micromirror Array Lens 191 and the second Micromirror Array Lens 192 forms optical surface profiles simulating a primary mirror and a secondary mirror of the Newtonian telescope, respectively and are arranged to have a Newtonian telescope configuration. The first Micromirror Array Lens 191 forms an optical surface profile simulating a parabolic concave mirror, a spherical concave mirror, or any other mirror having a desired curved surface. The second Micromirror Array Lens 192 forms an optical surface profile simulating a flat mirror or any other mirror having a desired curved surface. The first Micromirror Array Lens 191 is arranged to reflect light from the scene to the second Micromirror Array Lens 192 and the second Micromirror Array Lens 192 is arranged to reflect the light from the first Micromirror Array Lens 191 to the focal plane through a hole 194 in a lens tube. The first Micromirror Array Lens 191 is controlled to change at least one of focusing properties including the effective focal length, field of view, magnification, and optical axis of the lens unit and the second Micromirror Array Lens 192 is controlled to maintain focus of the image. The lens unit can further comprise an auxiliary lens or lens group 195 to focus the image to the imaging unit 196.

FIG. 20 is a schematic diagram showing a Cassegrain telescope type optical tracking device according to the embodiment of the present invention. The conventional Cassegrain telescope uses a parabolic concave primary mirror having a fixed focal length and a hyperbolic convex secondary mirror having a fixed focal length. The primary mirror reflects light to the secondary mirror and the secondary mirror reflects the light back to the focal plane through a hole in the primary mirror. The lens unit of the Cassegrain telescope type optical tracking device of the present invention comprises a first Micromirror Array Lens 201 comprising a plurality of micromirrors and a second Micromirror Array Lens 202 comprising a plurality of micromirrors 203, wherein the first Micromirror Array Lens 201 and the second Micromirror Array Lens 202 forms optical surface profiles simulating a primary mirror and a secondary mirror of the Cassegrain telescope, respectively and are arranged to have a Cassegrain telescope configuration. The first Micromirror Array Lens 201 forms an optical surface profile simulating a parabolic concave mirror, or any other mirror having a desired curved surface. The second Micromirror Array Lens 202 forms an optical surface profile simulating a hyperbolic convex mirror, or any other mirror having a desired curved surface. The first Micromirror Array Lens 201 is arranged to reflect light from the scene to the second Micromirror Array Lens 202 and the second Micromirror Array Lens 202 is arranged to focus the light from the first Micromirror Array Lens 201 back to the focal plane through a hole 204 in the first Micromirror Array Lens. The first Micromirror Array Lens 201 is controlled to change at least one of focusing properties including the effective focal length, field of view, magnification, and optical axis of the lens unit and the second Micromirror Array Lens 202 is controlled to maintain focus. The lens unit can further comprise an auxiliary lens or lens group 205 to focus the image to the imaging unit 206.

FIG. 21 is a schematic diagram showing a Gregorian telescope type optical tracking device according to the embodiment of the present invention. The conventional Gregorian telescope uses a parabolic concave primary mirror having a fixed focal length and a curbed concave secondary mirror having a fixed focal length. The primary mirror focus light before the secondary mirror and the secondary mirror reflects the light back to the focal plane through a hole in the primary mirror. The lens unit of the Gregorian telescope type optical tracking device of the present invention comprises a first Micromirror Array Lens 211 comprising a plurality of micromirrors and a second Micromirror Array Lens 212 comprising a plurality of micromirrors 213, wherein the first Micromirror Array Lens 211 and the second Micromirror Array Lens 212 forms optical surface profiles simulating a primary mirror and a secondary mirror of the Gregorian telescope, respectively and are arranged to have a Gregorian telescope configuration. The first Micromirror Array Lens 211 forms an optical surface profile simulating a parabolic concave mirror, or any other mirror having a desired curved surface. The second Micromirror Array Lens 212 forms an optical surface profile simulating an ellipsoidal convex mirror, or any other mirror having a desired curved surface. The first Micromirror Array Lens 211 is arranged to focus light from the scene before the second Micromirror Array Lens 212 and the second Micromirror Array Lens 212 is arranged to focus the light from the first Micromirror Array Lens 211 back to the focal plane through a hole 214 in the first Micromirror Array Lens. The first Micromirror Array Lens 211 is controlled to change at least one of focusing properties including the effective focal length, field of view, magnification, and optical axis of the lens unit and the second Micromirror Array Lens 212 is controlled to maintain focus. The lens unit can further comprise an auxiliary lens or lens group 215 to focus the image to the imaging unit 216.

Each telescope configuration described above has many variations. Although the embodiments of these variations are not shown, these variations can be readily simulated by an optical tracking device using Micromirror Array Lenses.

The advantages of the present invention include ability to rapidly change the focal length and optical axis of a camera system, allowing for high-resolution, wide-angle imaging. While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. An optical tracking device, comprising:
   (a) a lens unit comprising at least one Micromirror Array Lens, wherein the Micromirror Array Lens comprises a plurality of micromirrors and is configured to have a plurality of optical surface profiles by controlling rotations or translations of the micromirrors, wherein the motions of micromirrors in the Micromirror Array Lens is controlled to correct aberration;
   (b) a control circuitry, communicatively coupled to the lens unit, configured to control the motions of micromirrors in the Micromirror Array Lens to form optical surface profiles for changing a focusing property of the lens unit; and
   (c) an imaging unit comprising at least one image sensor, optically coupled to the lens unit, configured to receive a scene image formed by the lens unit to generate image information of the scene image.

2. The optical tracking device of claim 1, further comprising an image processing unit, communicatively coupled to the imaging unit, configured to process the image information from the imaging unit, wherein the image processing unit extracts target movement information and generates a control signal for the control circuit to control the lens unit.

3. The optical tracking device of claim 1, wherein the focusing property of the lens unit is an effective focal length of the lens unit.

4. The optical tracking device of claim 1, wherein the focusing property of the lens unit is an optical axis of the lens unit.

5. The optical tracking device of claim 1, wherein the focusing property of the lens unit is a magnification of the lens unit.

6. The optical tracking device of claim 1, wherein the focusing property of the lens unit is a field of view of the lens unit.

7. The optical tracking device of claim 1, wherein the optical surface profile of the Micromirror Array Lens satisfies a convergence condition and a phase matching condition to simulate a flat mirror.

8. The optical tracking device of claim 1, wherein the optical surface profile of the Micromirror Array Lens satisfies a convergence condition and a phase matching condition to simulate a parabolic concave mirror.

9. The optical tracking device of claim 1, wherein the optical surface profile of the Micromirror Array Lens satisfies a convergence condition and a phase matching condition to simulate a spherical concave mirror.

10. The optical tracking device of claim 1, wherein the optical surface profile of the Micromirror Array Lens satisfies a convergence condition and a phase matching condition to simulate a hyperbolic concave mirror.

11. The optical tracking device of claim 1, wherein the optical surface profile of the Micromirror Array Lens satisfies a convergence condition and a phase matching condition to simulate an elliptic concave mirror.

12. The optical tracking device of claim 1, wherein the optical surface profile of the Micromirror Array Lens satisfies a convergence condition and a phase matching condition to simulate a parabolic convex mirror.

13. The optical tracking device of claim 1, wherein the optical surface profile of the Micromirror Array Lens satisfies a convergence condition and a phase matching condition to simulate a spherical convex mirror.

14. The optical tracking device of claim 1, wherein the optical surface profile of the Micromirror Array Lens satisfies a convergence condition and a phase matching condition to simulate a hyperbolic convex mirror.

15. The optical tracking device of claim 1, wherein the optical surface profile of the Micromirror Array Lens satisfies a convergence condition and a phase matching condition to simulate an elliptic convex mirror.

16. The optical tracking device of claim 1, wherein the Micromirror Array Lens is a primary mirror in the telescope type configuration.

17. The optical tracking device of claim 16, wherein the Micromirror Array Lens has an opening, wherein light can pass through the Micromirror Array Lens.

18. The optical tracking device of claim 1, wherein the Micromirror Array Lens is a secondary mirror in the telescope type configuration.

19. The optical tracking device of claim 1, wherein the Micromirror Array Lens in a variator, wherein the variator is configured to change the focusing property of the lens unit.

20. The optical tracking device of claim 1, wherein the Micromirror Array Lens is a compensator, wherein the compensator is configured to maintain focus of the lens unit.

21. The optical tracking device of claim 1, wherein the lens unit comprises a first Micromirror Array Lens and a second Micromirror Array Lens.

22. The optical tracking device of claim 21, wherein the first Micromirror Array Lens is arranged to reflect light from the scene to the second Micromirror Array Lens and the second Micromirror Array Lens is arranged to reflect the light from the first Micromirror Array Lens to the imaging unit.

23. The optical tracking device of claim 21, wherein the first Micromirror Array Lens and the second Micromirror Array Lens are positioned so that the path of the light reflected by the first Micromirror Array Lens and the second Micromirror Array Lens is not blocked.

24. The optical tracking device of claim 21, further comprising a beam splitter positioned between the first Micromirror Array Lens and the second Micromirror Array Lens.

25. The optical tracking device of claim 21, wherein the first Micromirror Array Lens and the second Micromirror Array form a telescope type configuration.

26. The optical tracking device of claim 21, wherein the first Micromirror Array Lens and the second Micromirror Array form a Newtonian type telescope configuration.

27. The optical tracking device of claim 21, wherein the first Micromirror Array Lens and the second Micromirror Array form a Cassegrain type telescope configuration.

28. The optical tracking device of claim 21, wherein the first Micromirror Array Lens and the second Micromirror Array form a Gregorian type telescope configuration.

29. The optical tracking device of claim 1, wherein the lens unit further comprises a focus lens or lens group.

30. The optical tracking device of claim 1, wherein the lens unit further comprises a relay lens or lens group.

31. The optical tracking device of claim 1, wherein the lens unit further comprises an erect lens or lens group.

32. The optical tracking device of claim 1, wherein the lens unit further comprises a fixed-focus lens or lens group having macroscopic mechanical lens movements, optically coupled to the Micromirror Array Lens.

33. The optical tracking device of claim 32, wherein the fixed-focus lens or lens group having macroscopic mechanical lens movements is a compensator, wherein the compensator is configured to maintain focus of the lens unit.

34. The optical tracking device of claim 32, wherein the fixed-focus lens or lens group having macroscopic mechanical lens movements is a variator, wherein the variator is configured to change the focusing property of the lens unit.

35. The optical tracking device of claim 1, wherein the lens unit further comprises a non-MAL (Micromirror Array Lens) variable focus lens, wherein a focal length of the non-MMAL variable focus lens is changed.

36. The optical tracking device of claim 35, wherein the non-MMAL variable focus lens is a compensator, wherein the compensator is configured to maintain focus of the lens unit.

37. The optical tracking device of claim 35, wherein the non-MMAL variable focus lens is a variator, wherein the variator is configured to change the focusing property of the lens unit.

38. The optical tracking device of claim 1, wherein the lens unit further comprises a flat mirror.

39. The optical tracking device of claim 1, further comprising a mechanical movement unit, communicatively coupled to the image processing unit, configured to mechanically adjust attitude of the optical tracking device in response to the control signal in order to adjust the optical axis of the lens unit.

40. A method for detecting and tracking a target using an optical device comprising steps of:
   capturing a scene image using a lens unit having at least one Micromirror Array Lens comprising a plurality of micromirrors and an imaging unit;
   processing the scene image using an image processing unit and extracting target movement information;
   generating a control signal; and
   changing a focusing property of the Micromirror Array Lens by forming an optical surface profile of the Micromirror Mirror Array Lens by controlling motions of the micromirrors in the Micromirror Array Lens according to the control signal while the motions of micromirrors in the Micromirror Array Lens is controlled to correct aberration.

41. The method of claim 40, wherein the step of changing the focusing property of the Micromirror Array lens is for focusing a target image.

42. The method of claim 40, wherein the step of changing the focusing property of the Micromirror Array Lens is for adjusting an effective focal length of the lens unit.

43. The method of claim 40, wherein the step of changing the focusing property of the Micromirror Array lens is for adjusting a field of view of the lens unit.

44. The method of claim 40, wherein the step of changing the focusing property of the Micromirror Array lens is for adjusting an optical axis of the lens unit.

45. The method of claim 40, wherein the stop of changing the focusing property of the Micromirror Array lens is for adjusting a magnification of the lens unit.

46. The method of claim 40, further comprising:
   measuring the distance between the lens unit and the target by extracting an in-focus target image from the scene image using the image processing unit.

47. The method of claim 40, further comprising:
   measuring three-dimensional image information of the target by changing a focal plane of the lens unit by adjusting the effect focal length of the lens unit.

48. The method of claim 40, further comprising:
   using a time-sharing technique with the optical device to obtain a wide field of view image and a narrow field of view image within a short time period.

* * * * *